United States Patent
Zafiris et al.

(10) Patent No.: US 11,582,325 B2
(45) Date of Patent: Feb. 14, 2023

(54) SYSTEMS AND METHODS FOR ROUTING REMOTE APPLICATION DATA

(71) Applicant: Citrix Systems, Inc., Fort Lauderdale, FL (US)

(72) Inventors: Paraskevas Zafiris, Patras (GR); Ioannis Beredimas, Patras (GR); Konstantinos Papanikitas, Patras (GR)

( * ) Notice: Subject to any disclaimer, the term of this patent is extended or adjusted under 35 U.S.C. 154(b) by 0 days.

(21) Appl. No.: 17/372,061

(22) Filed: Jul. 9, 2021

(65) Prior Publication Data

US 2022/0400161 A1    Dec. 15, 2022

Related U.S. Application Data

(63) Continuation of application No. PCT/GR2021/000037, filed on Jun. 15, 2021.

(51) Int. Cl.
| | |
|---|---|
| G06F 9/50 | (2006.01) |
| G06F 11/07 | (2006.01) |
| G06F 11/30 | (2006.01) |
| G06F 11/32 | (2006.01) |
| G06F 11/34 | (2006.01) |
| H04L 67/60 | (2022.01) |
| G06F 16/953 | (2019.01) |
| H04L 67/10 | (2022.01) |
| G06F 9/54 | (2006.01) |
| H04L 61/4511 | (2022.01) |
| H04L 61/5007 | (2022.01) |

(52) U.S. Cl.
CPC .............. H04L 67/60 (2022.05); G06F 9/547 (2013.01); G06F 16/953 (2019.01); H04L 61/4511 (2022.05); H04L 61/5007 (2022.05); H04L 67/10 (2013.01)

(58) Field of Classification Search
CPC ................. H04L 67/32; H04L 61/1511; H04L 67/2007; G06F 16/953; G06F 9/547
See application file for complete search history.

(56) References Cited

U.S. PATENT DOCUMENTS

| | | | |
|---|---|---|---|
| 6,968,389 B1 * | 11/2005 | Menditto | H04L 61/4511 709/219 |
| 10,530,632 B1 * | 1/2020 | Mukhopadhyaya | H04L 43/08 |

(Continued)

OTHER PUBLICATIONS

International Search Report and Written Opinion on PCT Appl. No. PCT/GR2021/000037 dated Feb. 28, 2022.

*Primary Examiner* — Christopher B Robinson

(57) ABSTRACT

Described embodiments provide for routing remote application data. A device can receive a request to access an application. The application can be provided by data centers and accessible via service providers. The device can select a data center from the plurality of data centers and a service provider based at least on a metric indicative of a connection between the data center and the service provider. The device can query a database including one or more connection metrics using the application identified in the request and a location of a router transmitting the request. The device can determine the location of the router based on an internet protocol (IP) address of a client communicably coupled to the router. The device can transmit a response to the request identifying the selected data center and the selected service provider.

19 Claims, 18 Drawing Sheets

(56) References Cited

U.S. PATENT DOCUMENTS

| | | | |
|---|---|---|---|
| 2006/0195607 A1* | 8/2006 | Naseh | H04L 67/1006 709/238 |
| 2010/0250742 A1* | 9/2010 | Leighton | H04L 67/1001 709/224 |
| 2011/0153840 A1 | 6/2011 | Narayana et al. | |
| 2012/0239792 A1* | 9/2012 | Banerjee | G06F 9/5072 709/223 |
| 2014/0258536 A1 | 9/2014 | Chiong | |
| 2014/0280972 A1* | 9/2014 | Calippe | H04L 67/1012 709/226 |
| 2017/0054748 A1* | 2/2017 | Allen | H04L 63/1425 |
| 2020/0162959 A1 | 5/2020 | Radlein et al. | |

* cited by examiner

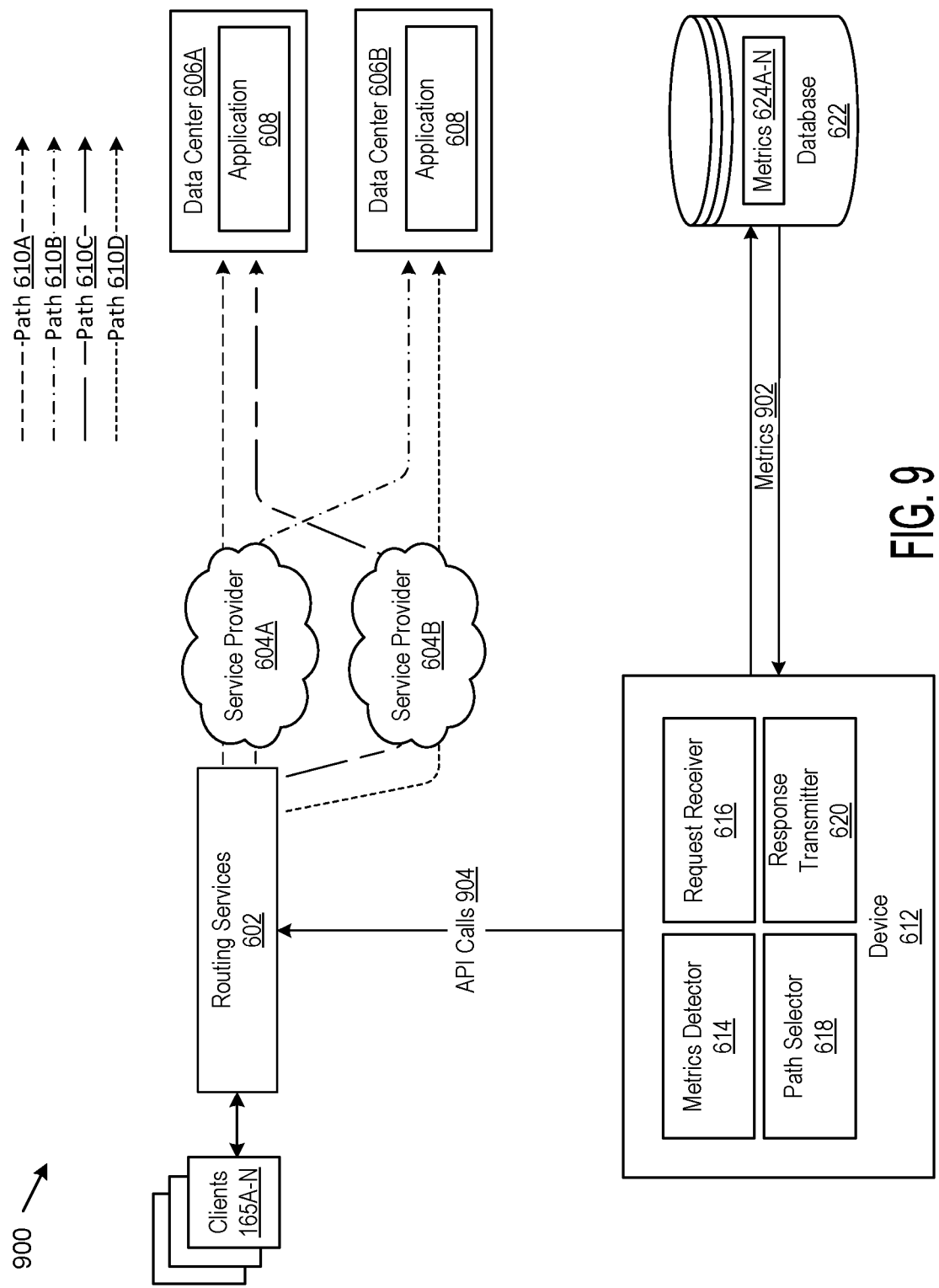

SYSTEMS AND METHODS FOR ROUTING REMOTE APPLICATION DATA

CROSS-REFERENCE TO RELATED APPLICATIONS

This application is a continuation of and claims priority to International Application No. PCT/GR2021/000037, titled "SYSTEMS AND METHODS FOR ROUTING REMOTE APPLICATION DATA," and filed on Jun. 15, 2021, the contents of all of which are hereby incorporated herein by reference in its entirety for all purposes.

FIELD OF THE DISCLOSURE

The present application generally relates to computers and networking systems. In particular, the present application relates to systems and methods for improved routing data to and from remote applications.

BACKGROUND

A network administrator may deploy an application across multiple datacenters, with the intent of identifying the optimal data center from which to deliver the application to a device of an end user.

BRIEF SUMMARY

Optimizing delivery of content from internet, web-based, or other remotely accessed applications typically involves deploying the application across multiple data centers. When a client accesses an application deployed at a data center, various systems may identify the optimal or desired data center for which the client is to access the application. One approach to optimize the delivery of applications is Global Server Load-Balancing (GSLB), which relies on a Domain Name System (DNS). GSLB may be used to determine an access point for a client from multiple data centers (DC) across multiple geographies ("geo-s"; typically a "geo" refers to a large region, i.e. east-US, central-EU, India, China, etc.). When a client attempts to access an application, a DNS query is performed to determine an address of the client (i.e., an internet protocol address). The GSLB end point can then use one or more schemes to determine the response payload, including but not limited to user-to-data center proximity, application health of each data center, application loading response latency in a data center, measurements from one or more clients, or metrics related to reachability, end-to-end performance of each data center from the user's ISP, and/or even randomness. Therefore, GSLB can adapt to varying changing conditions to select an optimal or desired data center for the user.

However, GSLB and similar methods (e.g., anycast etc.) may focus on the application side rather than on the client side, which fails to accommodate multipath routing. For example, a user at a geolocation can use fixed or mobile connectivity (e.g., CABLE/LTE) in an active or failover fashion, to access an application available from data centers at different locations. Therefore, if there is a localized Internet connectivity issue that results in the application being unavailable through the active (fixed) line, then a GSLB system powered by measurements from one or more clients can identify this issue and switch the user to a different path to ensure application availability. However, if a data center in a remote geolocation serves the application, this change may increase the application latency and may significantly degrade the user's experience. For example, if a user located in North America connects via a data center in Europe, then the latency increases because the time it takes for the packets of data to travel between the data center and the user increases, which causes the application to load slowly and thus degrade the user's experience. Another option is to connect users via a failover path, but this approach can create excessive redundancy that is inefficient. For example, a failover path can be a network path that includes backup networking components in the same location as existing networking components. When existing networking components fail, the backup networking components can serve the users. However, when existing networking components are operational, the backup networking components are not used, which is an inefficient and expensive use of resources. Accordingly, when a routing service is capable of multipath routing to different internet service providers (ISPs) or mediums (MPLS, cable, mobile, etc.), and an application is available at multiple geolocations, optimal routing of connections along different paths and locations is difficult.

The present disclosure can include an application arbiter (also referred to herein as a device). The device can be configured to optimally route application data and network traffic using metrics from a database (e.g., a measurement database). The device can provide the routing service with a list of applications (e.g., DNS names), which can be optimized through a dynamic selection of ISPs. Once an application has been marked as ISP-aware, the routing service can enrich outgoing DNS request for the respective domain. The enrichment provides the GSLB with additional data to consider N-path routing, which allows the GSLB to route application data according to an N×M matrix rather than just the row (e.g., M) that corresponds to the source IP of the DNS request. For example, row-based routing is merely selecting between data centers available via a service provider that corresponds to the source IP of the DNS request to route the application data. However, the device can enable the routing service to consider ISPs (e.g., column or N routing) and data centers to select an ISP and a data center combination (e.g., N×M routing) along which to route the application data.

Enriching a DNS request can include receiving a DNS request for a particular application. If the application is marked as an ISP-aware domain, then additional metadata can enrich the request for all the ISPs of the appliance. The routing service can also omit ISPs corresponding to unavailable links. The GSLB can retrieve, from the measurements database, data corresponding to the data centers and ISPs. An endpoint of the GSLB can send a standard DNS response, which can indicate an optimal (for example, desired or preferred) datacenter based on the source IP (ISP-1) of the original DNS query. However, the enriched response can include an optimal combination of the ISP and the data center, and the metadata of the matrix. For example, the enriched response can include the specific datacenter corresponding to the ISP, an ISP-datacenter coupling, and contents from the table. The routing service can use the enriched response to update its database to override a network path. Conversely, the routing service can apply the path from the enriched response only in certain conditions. For example, if the existing path is a primary-fixed or a failover-mobile link but the enriched response selects the mobile path as optimal, then the routing service can use the path only if associated metadata indicates significant connectivity issues between the fixed-line ISP and the application (e.g., outage or significant latency). The appliance or the application arbiter can set the conditions for applying various paths. Other conditions can include selecting paths with mobile network ISPs only when the user experience gains satisfy a minimum threshold (e.g., avoid relying on mobile network ISPs unless latency reduced by at least 100 ms).

Clients probing the application can provide measurements, data, or other metrics, which the device can compile or aggregate into metrics for one or more network paths. Since the device can acquire the metrics from multiple clients, the metrics can be referred to as crowd-sourced measurements. The metrics can measure application access or benchmark objects residing in the application environment. For example, the metrics can indicate locations of the clients and data centers, network status (e.g., online or offline) of the ISPs or data centers, which ISPs or data centers are used to facilitate connections between the clients and the applications, latency of the connections between the applications and the clients, or the bandwidth of the connections. The routing service can acquire the metrics in a programmatic manner. For example, the device can notify the application of both the application DNS domain and the target IP addresses to use for probing. The routing service can programmatically generate probes from individual ISPs towards different data centers to generate the measurements or metrics. The routing service can react to partial outages (e.g., an ISP or a DC) faster by having metrics from which to optimize an optimal connection path. The routing service can also enrich the metrics with programmatically generated probes. Accordingly, the routing service can maintain an N×M reachability and latency matrix, which can complement the one stored in the database. For example, a localized (e.g., citywide) latency spike might not be identified in the metrics database, but can be quickly noticed by the routing service. Additionally, the routing service can pre-populate the N×M matrix in the routing service. Pre-populating can offload the overhead of the DNS manipulation at the cost of increasing the complexity of the device, which can retrieve said data and update routing service.

At least one aspect of this disclosure is directed to a method. The method includes receiving, by a device, a request to access an application. The application may be provided by one of a plurality of data centers and accessible via one of a plurality of service providers. The method includes selecting, by the device, a data center from the plurality of data centers and a service provider from the plurality of service providers based at least on a metric indicative of a connection between the data center and the service provider. The method includes transmitting, by the device, a response to the request identifying the selected data center and the selected service provider.

In some embodiments, selecting the data center and the service provider includes querying, by the device, a database including one or more metrics indicative of one or more connections using the application identified in the request and a location of a router transmitting the request. In some embodiments, the location of the router is determined based on an internet protocol (IP) address of a client communicably coupled to the router. In some embodiments, the metric includes an availability of the plurality of service providers, latency of data accessed via a respective service provider from a respective data center, or data throughput via the respective service provider and the respective data center. In some embodiments, the response includes a table including one or more metrics indicative of one or more connections for the plurality of service providers in relation to the plurality of data centers.

In some embodiments, the method further includes generating, by the device, instructions to cause a router to use the selected service provider to access the selected data center included in the response to access the application. In some embodiments, the method further includes transmitting, by the device, the instructions to the router to cause the router to select the service provider of the plurality of service providers and the data center of the plurality of data centers. In some embodiments, the method further includes transmitting, by the device to the application, a notification identifying an application domain name system (DNS) and target IP addresses to use for probing the application. The method may further include transmitting, by the device to a router, instructions to cause the router to automatically detect network problems between each of the plurality of service providers and each of the plurality of data centers. In some embodiments, the method further includes providing, by the device, a content item to the application for acquiring one or more metrics indicative of one or more connections responsive to the content item accessed via a plurality of routers. The method may further include receiving, by the device, from the plurality of routers, data responsive to the content item being accessed via the respective routers. The one or more metrics may be aggregated from the received data of the plurality of routers. In some embodiments, the plurality of service providers are a plurality of internet service providers.

Another aspect of this disclosure is directed to a device. The device includes one or more processors configured to receive a request to access an application. The application is provided by one of a plurality of data centers and accessible via one of a plurality of service providers. The one or more processors are configured to select a data center from the plurality of data centers and a service provider from the plurality of service providers based at least on a metric indicative of a connection between the data center and the service provider. The one or more processors are configured to transmit a response to the request identifying the selected data center and the selected service provider.

In some embodiments, selecting the data center and the service provider includes querying a database including one or more metrics indicative of one or more connections using the application identified in the request and a location of a router transmitting the request. In some embodiments, the location of the router is determined based on an internet protocol (TP) address of a client communicably coupled to the router. In some embodiments, the metric includes an availability of the plurality of service providers, latency of data accessed via a respective service provider from a respective data center, or data throughput via the respective service provider and the respective data center. In some embodiments, the response includes a table including one or more metrics indicative of one or more connections for the plurality of service providers in relation to the plurality of data centers.

In some embodiments, the one or more processors are further configured to generate instructions to cause a router to use the selected service provider to access the selected data center included in the response to access the application. In some embodiments, the one or more processors are further configured to transmit the instructions to the router to cause the router to select the service provider of the plurality of service providers and the data center of the plurality of data centers. In some embodiments, the one or more processors are further configured to transmit, to the application, a notification identifying an application domain name system (DNS) and target IP addresses to use for probing the application. The one or more processors may further be configured to transmit, to a router, instructions to cause the router to automatically detect network problems between each of the plurality of service providers and each of the plurality of data centers. In some embodiments, the one or more processors are further configured to provide a content item to the application for acquiring one or more metrics indicative of one or more connections responsive to the content item accessed via a plurality of routers. The one or more processors may further be configured to receive, from the plurality of routers, data responsive to the content item being accessed via the respective routers. The one or more metrics may be aggregated from the received data of the plurality of routers.

Yet another aspect of this disclosure is directed to a non-transitory computer-readable medium storing instructions that, when executed by one or more processors, cause the one or more processors to receive a request to access an application. The application is provided by one of a plurality of data centers and accessible via one of a plurality of service providers. The computer-readable medium further stores instructions that cause the one or more processors to select a data center from the plurality of data centers and a service provider from the plurality of service providers based at least on a metric indicative of a connection between the data center and the service provider. The computer-readable medium further stores instructions that cause the one or more processors to transmit a response to the request identifying the selected data center and the selected service provider.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 9 is a diagram of a flow for application routing in accordance with an illustrative embodiment;

Figure 1A:
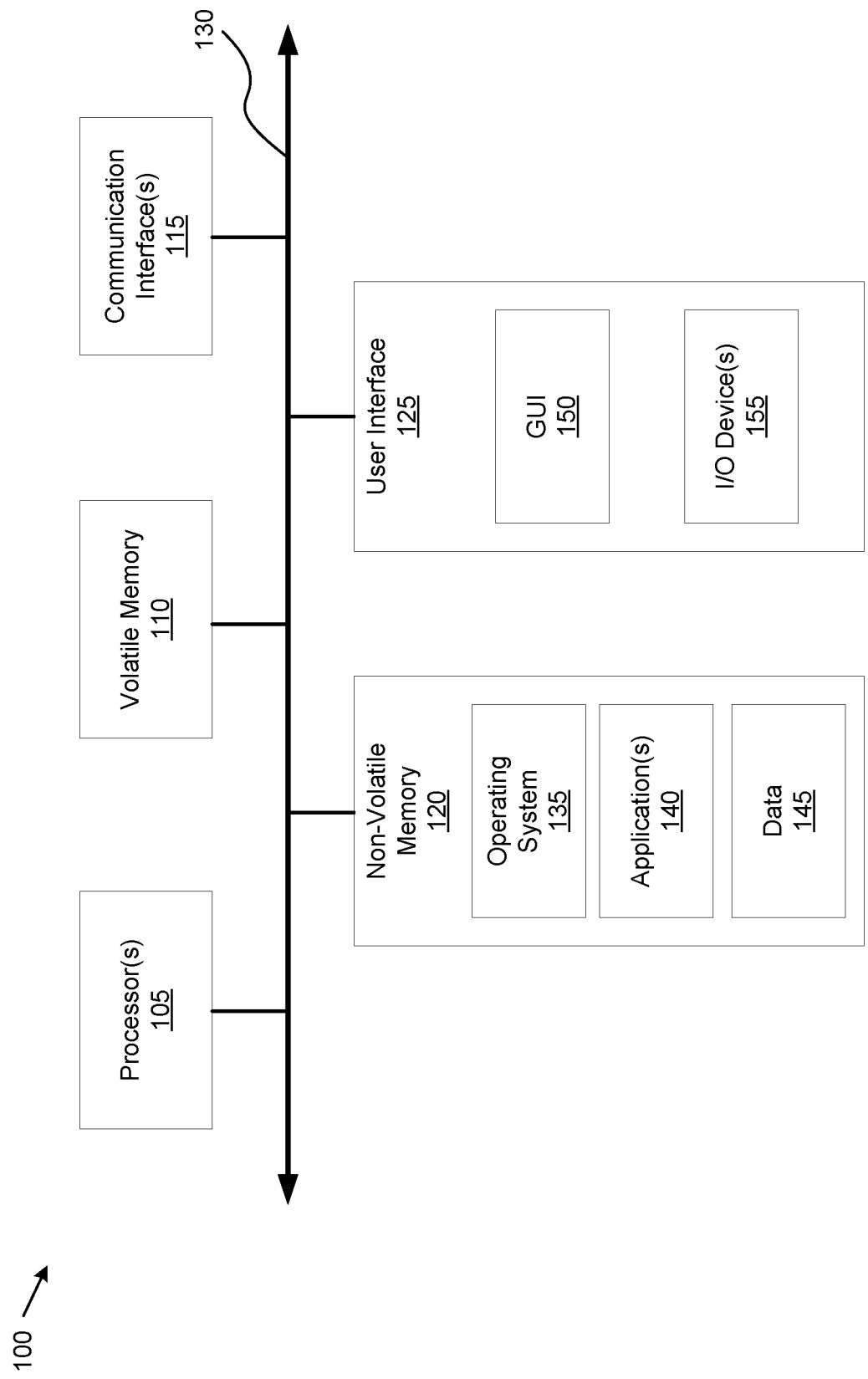
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Optimizing delivery of content from internet, web-based, or other remotely accessed applications typically involves deploying the application across multiple data centers. When a client accesses an application deployed at a data center, various systems may identify the optimal data center for which the client is to access the application. One approach to optimize the delivery of applications is Global Server Load-Balancing (GSLB), which relies on a Domain Name System (DNS). GSLB may be used to determine an access point for a client from multiple data centers (DC) across multiple geographies ("geo-s"; typically a "geo" refers to a large region, i.e. east-US, central-EU, India, China, etc.). When a client attempts to access an application, a DNS query is performed to determine an address of the client (i.e., an internet protocol address). The GSLB end point can then use one or more schemes to determine the response payload, including but not limited to user-to-data center proximity, application health of each data center, application loading response latency in a data center, metrics from one or more clients, or metrics related to reachability, end-to-end performance of each data center from the user's ISP, and/or even randomness. Therefore, GSLB can adapt to varying changing conditions to select an optimal data center for the user.

However, GSLB and similar methods (e.g., anycast etc.) may focus on the application side rather than on the client side, which fails to accommodate multipath routing. For example, a user at a geolocation can use fixed or mobile connectivity (e.g., CABLE/LTE) in an active or failover fashion, to access an application available from data centers at different locations. Therefore, if there is a localized Internet connectivity issue that results in the application being temporally unavailable through the active (fixed) line, a GSLB system utilizing metrics of one or more network paths from one or more clients can identify this failure and switch the user to a different path to ensure application availability. However, if a data center in a remote geolocation serves the application, this change may increase the application latency and may significantly degrade the user's experience. For example, if a user located in North America connects via a data center in Europe, then the latency increases because the time it takes for the packets of data to travel between the data center and the user increases, which causes the application to load slowly and thus degrade the user's experience. Another option is to connect users via a failover path, but this approach can create excessive redundancy that is inefficient. Accordingly, when a routing service is capable of multipath routing to different internet service providers (ISPs) or mediums (MPLS, cable, mobile, etc.), and an application is available at multiple geolocations, optimal routing of connections along different paths and locations is difficult. For example, routing services might not be able to route users through different ISPs to connect to data centers. Even then, routing services might not be able to determine all the possible combinations of ISPs and data centers along which to route the users to the applications. Moreover, routing services might not have any data about the combinations to determine whether a particular combination can improve a user's network experience.

The present disclosure can include an application arbiter (also referred to herein as a device). The device can be configured to optimally route application data and network traffic using data or metrics from a database (e.g., metrics database). The device can provide the routing service with a list of applications (e.g., DNS names), which can be optimized through a selection (e.g., dynamic selection) of ISPs. Once an application has been marked as ISP-aware, the routing service can enrich outgoing DNS request for the respective domain. The enrichment provides load-balancing services such as GSLB with additional data to consider N-path routing, which allows the load-balancing services to solve the matrix as an N×M matrix rather than just the row that corresponds to the source IP of the DNS request.

Enriching a request (e.g., a DNS request) can include a routing service receiving a request for a particular application. If the application is marked (e.g., as an ISP-aware domain), then additional metadata can enrich the request considering additional ISPs along which to route the request. The routing service can omit ISPs corresponding to unavailable links, such as those that are offline or unable to connect to data centers providing the requested application, from consideration for routing network traffic or requests. The routing service can retrieve, from the metrics database, data corresponding to the data centers and ISPs. An endpoint of the load-balancing service can send a response (e.g., a standard DNS response), which can indicate a datacenter (e.g., an optimal datacenter) based on the source IP (ISP-1) of the query. However, the enriched response can include an optimal combination of the ISP and the data center, and the metadata of the matrix. For example, the enriched response can include the specific datacenter corresponding to the ISP, an ISP-datacenter coupling, and contents from the table. The routing service can use the enriched response to update its database to override a network path. Conversely, the routing service can apply the path from the enriched response only in certain conditions. For example, if the existing path is a primary-fixed or a failover-mobile link but the enriched response selects the mobile path as optimal, then the routing service can use the path only if associated metadata indicates significant connectivity issues between the fixed-line ISP and the application (e.g., outage or significant latency). The appliance or the application arbiter can set the conditions for applying various paths. Other conditions can include selecting paths with mobile network ISPs only when the user experience gains satisfy a minimum threshold (e.g., avoid relying on mobile network ISPs unless latency reduced by at least 100 ms).

Clients probing the application can generate measurements, data, or other metrics, which may be compiled or aggregated into metrics for one or more network paths between the clients and the data centers. The measurements can measure or otherwise assess application access or benchmark objects residing in the application environment. The routing service can generate, receive, or acquire the data (e.g., metrics) in a programmatic manner. For example, the device can notify the application of both the application DNS domain and the target IP addresses to use for probing. The routing service can programmatically generate probes from individual ISPs towards different data centers to generate the measurements or metrics. The routing service can react to partial outages (e.g., an ISP or a DC) faster by having metrics from which to optimize a connection path. The routing service can also enrich the data or metrics with programmatically generated probes. Accordingly, the routing service can maintain an N×M reachability and latency matrix, which can complement the one stored in the database (e.g., a metrics database). For example, a localized (e.g., citywide) latency spike might not be identified in the database, but can be quickly noticed by the routing service. Additionally, the routing service can pre-populate the N×M matrix in the routing service. Pre-populating can offload the overhead of the DNS manipulation at the cost of increasing the complexity of the device, which can retrieve said data and update routing service. In various embodiments, a device may receive a request to access an application. The application may be provided by one of a plurality of data centers and accessible via one of a plurality of service providers. The device may select a data center from the plurality of data centers and a service provider from the plurality of service providers based at least on data (e.g., a one or more metrics) about the data center and the service provider. The device may transmit a response to the request identifying the selected data center and the selected service provider.

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds;

Section C describes load balancing of network traffic; and

Section D describes systems and methods for routing remote application data.

Section E describes various example embodiments of the systems and methods described herein.

A. Computing Environment

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computer 100 may execute an application on behalf of a user of a client computing device. For example, the computer 100 may execute a virtual machine, which provides an execution session within which applications execute on behalf of a user or a client computing device, such as a hosted desktop session. The computer 100 may also execute a terminal services session to provide a hosted desktop environment. The computer 100 may provide access to a computing environment including one or more of: one or more applications, one or more desktop applications, and one or more desktop sessions in which one or more applications may execute.

Figure 1B:
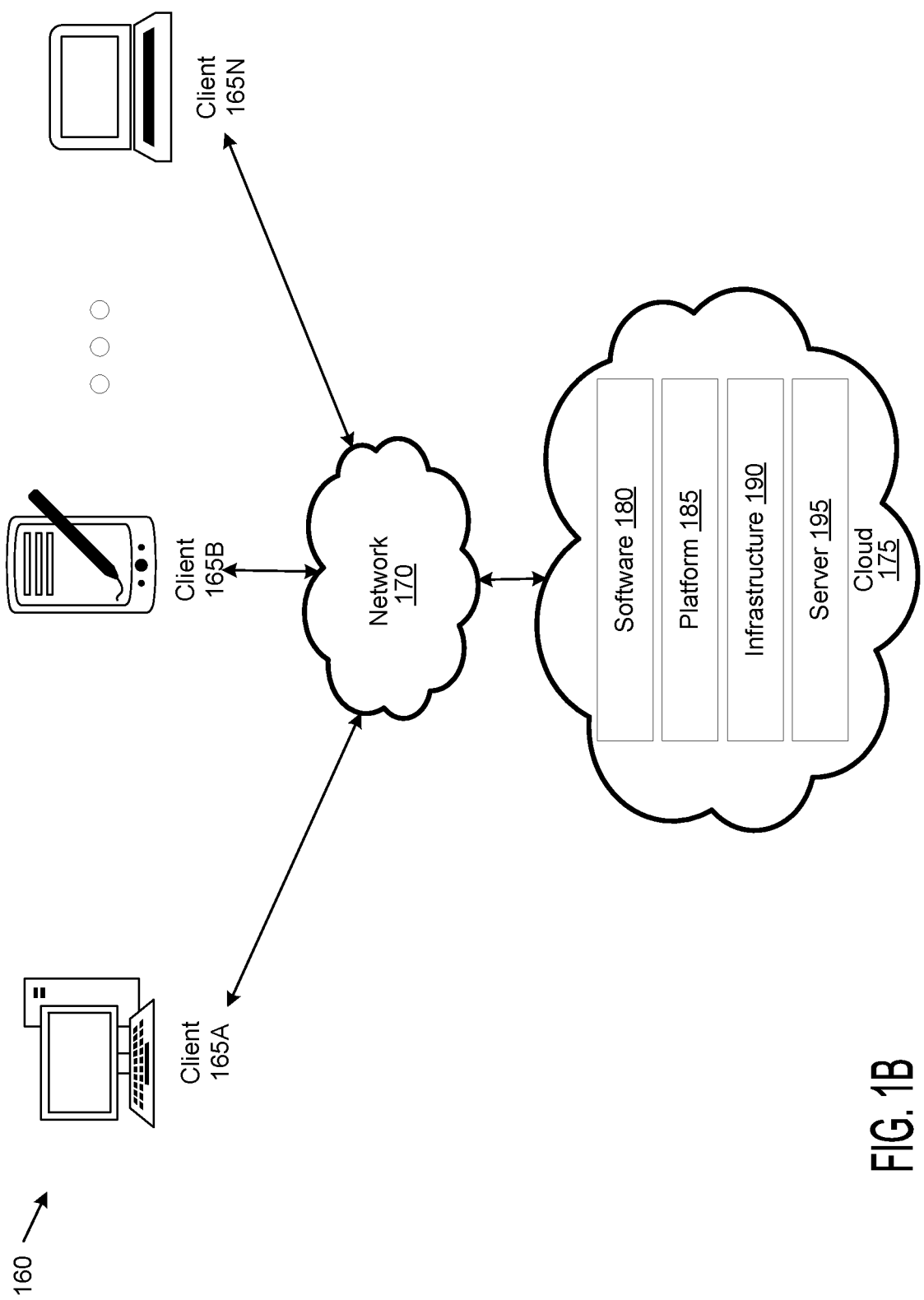
FIG. 1B is a block diagram depicting a computing environment comprising a client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
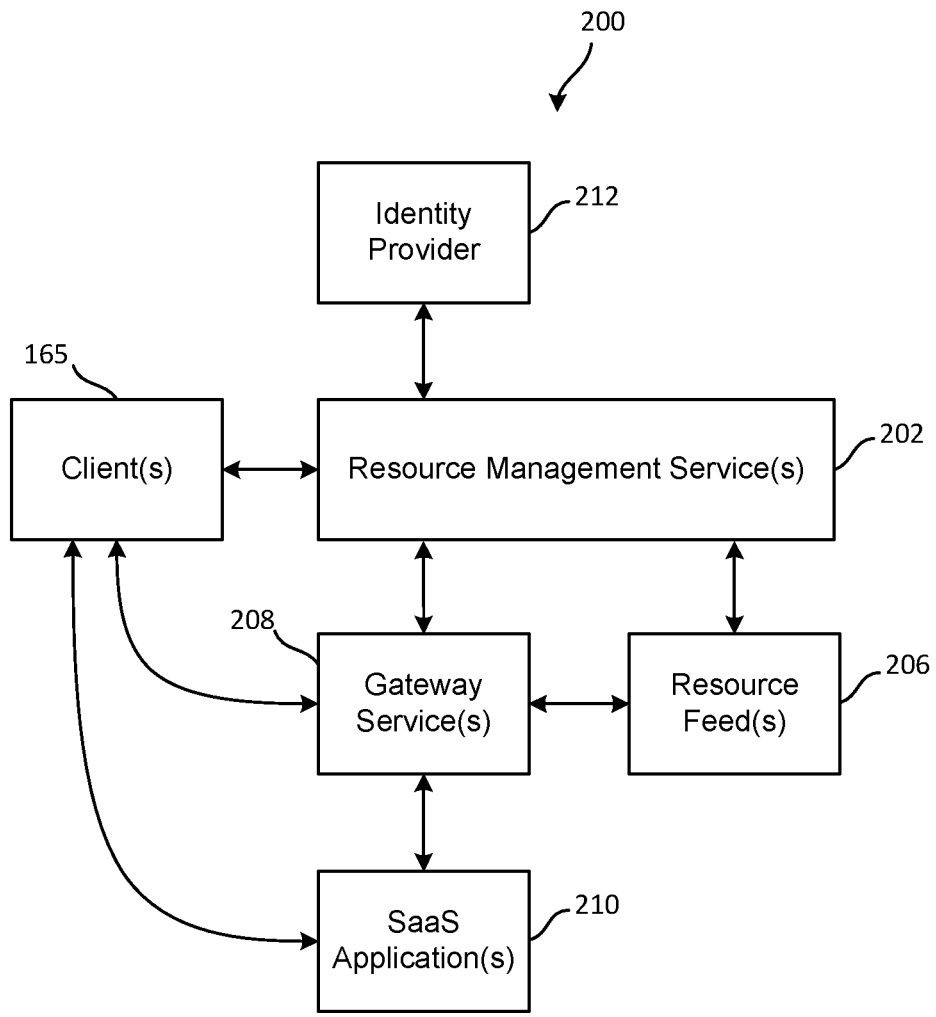
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more SaaS applications 210. In particular, the resource management service(s) 202 may employ an identity provider 212 to authenticate the identity of either end-users, which use a client 165, or the appliances themselves. Following authentication, the resource management service(s) 202 can identify one of more resources for which the user has authorization to access. For example, the resource management service(s) can identify that client 165A has authorization to access the resource feed related to DNS multipath routing whereas client 165B is not (e.g., client 165B is not licensed for a feature; client 165B is not multipath capable, etc.). In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, and network appliances such as routers and firewalls. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
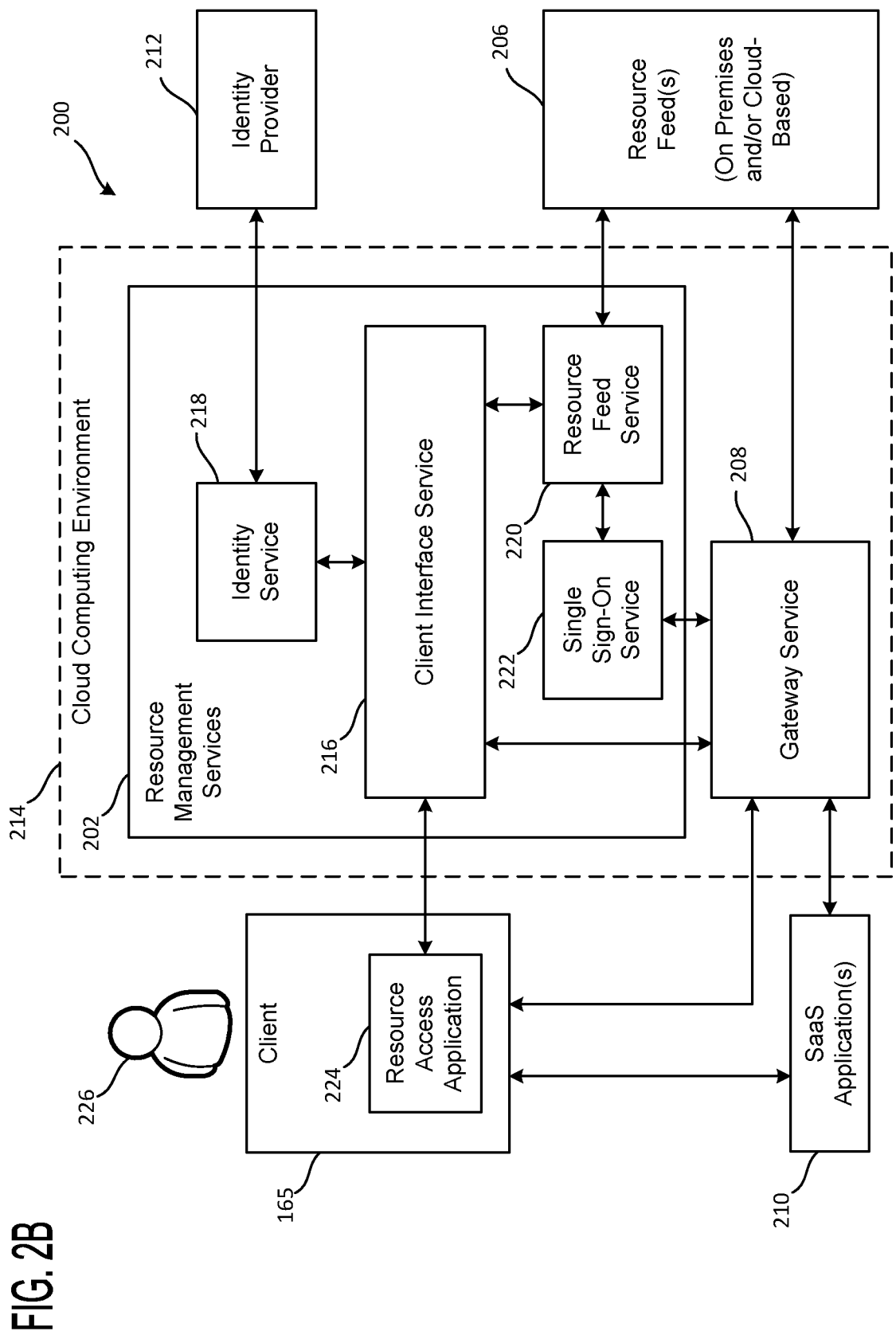
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud-computing environment may, for example, include MICROSOFT AZURE Cloud, AMAZON Web Services, GOOGLE Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, execute on WINDOWS Server instances hosted in resource locations, and may create a reverse proxy to route traffic between the site(s) and the cloud-computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data deployed across multiple locations for geo-redundancy.

When the resource access application 224 is launched or otherwise accessed by a respective client 165, the client interface service 216 may send a sign-on request to the identity service 218. In some embodiments, the identity provider 212 may be located on the premises of the organization for which the system 200 is deployed. The identity provider 212 may, for example, correspond to an on-premises WINDOWS Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a MICROSOFT AZURE Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For the configured resource feeds, the resource feed service 220 may request an identity token from the single sign-on service 222. The resource feed service 220 may then pass the feed-specific identity tokens it receives to the points of authentication for the respective resource feeds 206. The resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource access application 224 is located remotely) (e.g., via a secure browser service). In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access (e.g., by disabling cut/copy/paste operations between the application and the clipboard), (3) restricting printing (e.g., by disabling the ability to print from within the browser), (4) restricting navigation (e.g., by disabling the next and/or back browser buttons), (4) restricting downloads (e.g., by disabling the ability to download from within the SaaS application), and (5) displaying watermarks (e.g., by overlaying a screen-based watermark showing the username and IP address associated with the client 165 such that the watermark will appear as displayed on the screen if the user tries to print or take a screenshot). Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements (e.g., "approve," "deny," and "see more detail" buttons), allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
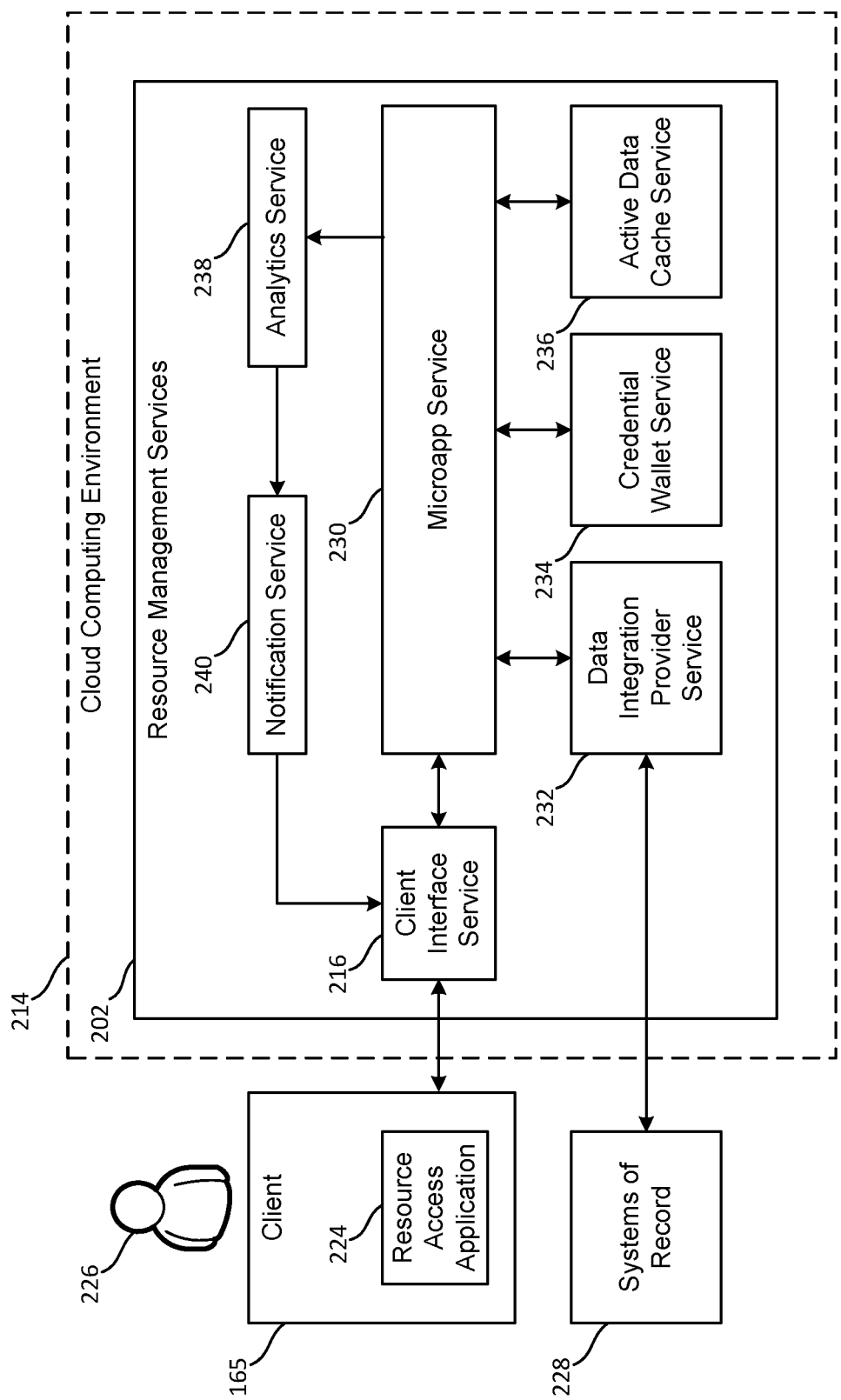
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud-computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 230 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance functionality either through the resource access application 224 or directly from another resource, such as Microsoft Teams. This feature may allow employees to work efficiently, stay organized, and deliver only the specific information they are looking for.

C. Load Balancing of Network Traffic

Figure 3:
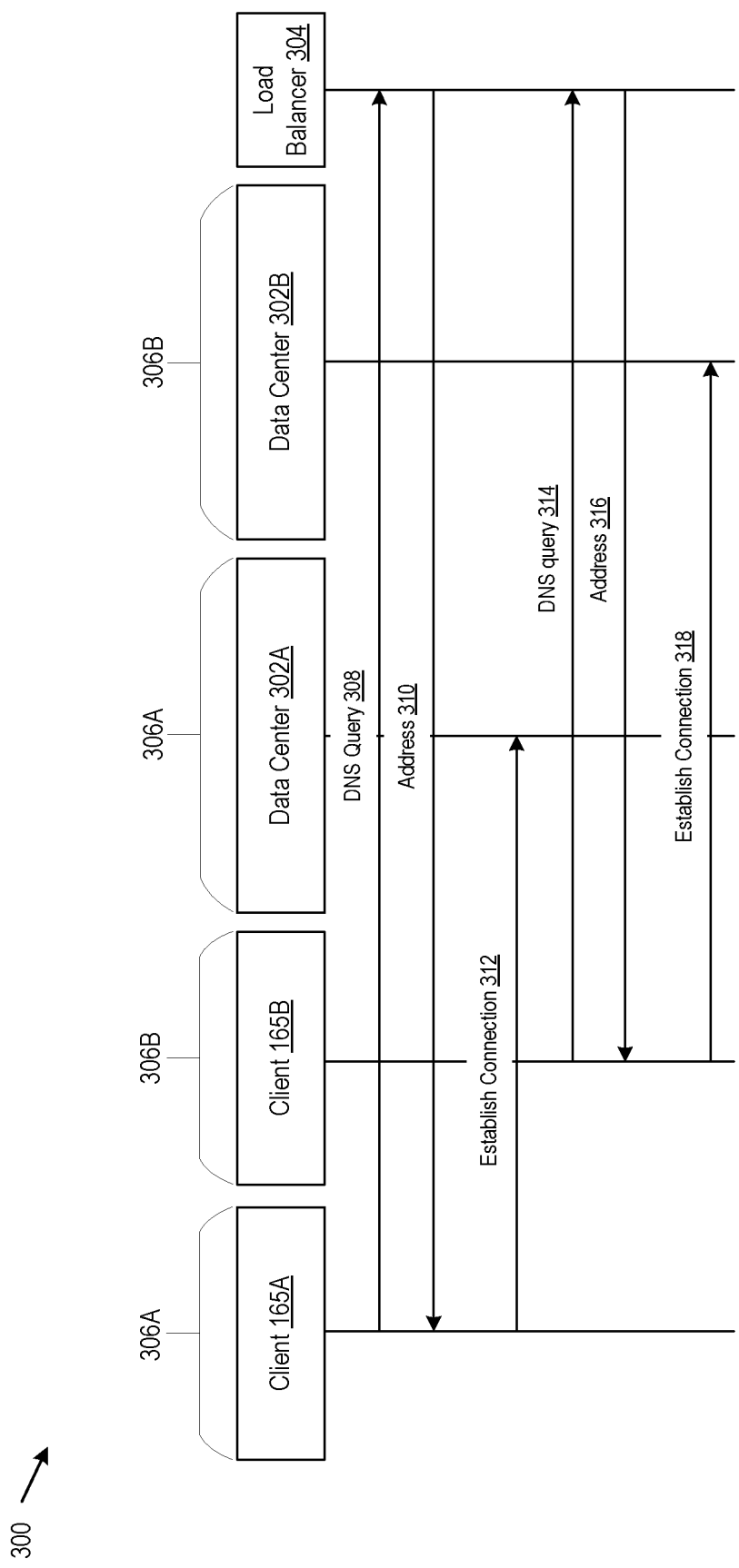
FIG. 3 is a diagram of a flow for GSLB for application delivery in accordance with an illustrative embodiment.

Referring now to FIG. 3, depicted is a diagram of a flow 300 for global server load balancing (GSLB) for application delivery, in accordance with an illustrative embodiment. Components described in FIGS. 1A, 1, and 2A-C, detailed above can perform the operations and functionalities of the flow 300. The flow 300 includes clients 165, data centers 302A and 302B (generally referred to as data centers 302), and a load balancer 304. The clients 165 and the data centers 302 are located at locations 306A and 306B (generally referred to as locations 306). Each location 306 refers to a region, such as eastern part of the United States, India, China, and so forth.

Under flow 300, the client 165A can submit a domain name service (DNS) query (STEP 308). When the client 165A attempts to access an application hosted by the data centers 302, the client 165A can submit the DNS query to the load balancer 304 to determine an Internet address of a datacenter 302 from which the client 165A is to access the application. The query can include the application that the client 165A is trying to access. The query can also include information indicating that the client 165A is located at location 306A, such as eastern USA. The load balancer 304 can respond with an address (STEP 310). The load balancer 304 can select data centers 302 from which it is optimal for the client 165A to access the application. For example, the data center 302 selected by the load balancer 304 can be optimal by providing the client 165 a low latency connection to the application. The load balancer 304 can use one or more approaches to select the data centers 302. The approaches can consider a proximity of the client 165A to the data centers 302, an application health of each data center 302, application loading response latency of each data center 302, measurements of one or more network paths acquired from one or more clients, end-to-end performance of each data center 302 for various ISPs associated with the client 165, or even random selection of the data center 302 (e.g., for example, using a round-robin, a percentage based selection, etc. if metrics or criteria according to which to select the data center 302 are unavailable). Therefore, load balancer 304 can adapt to varying changing conditions to select an optimal data center 302 for the client 165A. For example, the load balancer 304 can identify that the client 165A and the data center 302A are located at location 306A. The load balancer 304 select the data center 302A based on its location 306A matching the location 306A of the client 165A. After selecting the data center 302A, the GSLB can transmit an address of the data center 302A to the client 165A. The client 165A can establish a connection with the selected data center (STEP 312). The client 165A can use the address received from the load balancer 304 to connect to the selected data center 302.

Similarly, the client 165B can submit a domain name service (DNS) query (STEP 314). When the client 165B attempts access an application hosted by the data centers 302, the client 165B can submit the DNS query to the load balancer 304 to determine an Internet address of a datacenter from which to access the application. The load balancer 304 can respond with an address (STEP 316). The load balancer 304 can select data centers 302 from which it is optimal for the client 165B to access the application. The load balancer 304 select the data center 302B based on its location 306B matching the location 306B of the client 165B. After selecting the data center 302A, the GSLB can transmit an address of the data center 302B to the client 165B. The client 165B can establish a connection with the selected data center (STEP 318). The client 165B can use the address received from the load balancer 304 to connect to the selected data center 302. Accordingly, the load balancer 304 selects data centers 302 based on the indicators relating to the clients 165 and the data centers 302.

Figure 4:
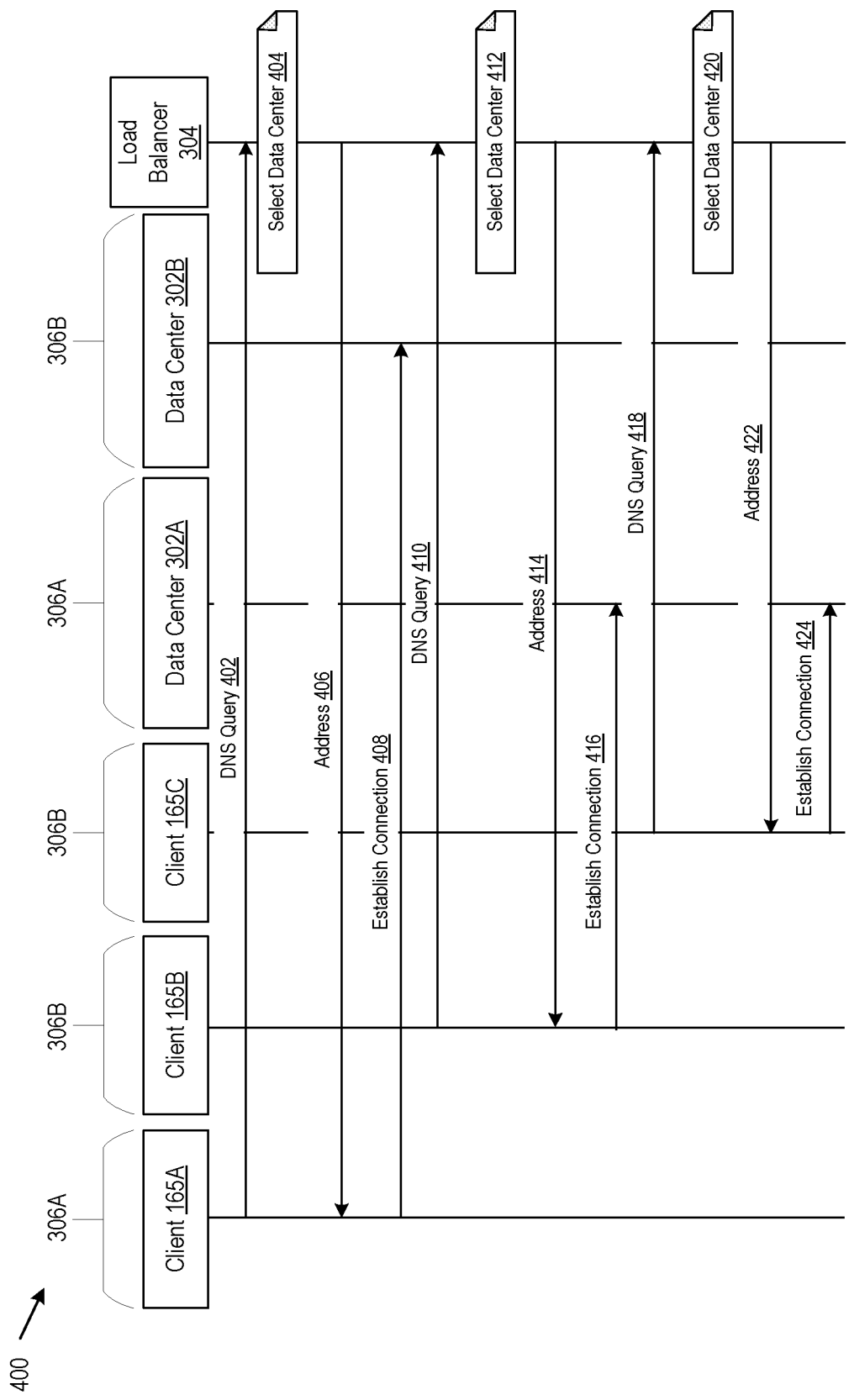
FIG. 4 is a diagram of a flow for GSLB for application delivery under varying conditions in accordance with an illustrative embodiment.

Referring now to FIG. 4, depicted is a diagram of a flow 400 for GSLB for application delivery under varying conditions, in accordance with an illustrative embodiment. Under flow 400, the clients 165 at their respective locations 306 can use fixed or mobile internet connections, such as wired connections provided by a router or other cable provider, wireless or mobile-based connections such as 3G, 4G, 5G, LTE, etc. In some embodiments, the clients 165 may use both fixed and mobile internet connections (e.g., in a primary and fallback fashion). For example, the clients 165 may use fixed connections as a primary connection (or default connection), and may use mobile connections as a fallback connection (or secondary connection) in the event of an interruption of the primary connection. Therefore, if there is a localized Internet connectivity issue that results in the application being temporally unavailable through the active (fixed) line, then the GSLB 304 can use data (e.g., crowd-sourced measurements or metrics) to identify this failure, and prompt the client 165 to switch to a different path (i.e., a different mobile connectivity) to ensure application availability and/or access to the application.

The client 165A can submit a DNS query to the load balancer 304 (STEP 402). The query can include the location 306A of the client 165A and the application for which the client 165A is requesting access. The load balancer 304 can select a data center for the client 165A to access the application (STEP 404). The load balancer 304 can identify a high latency, load, or utilization at the data center 302A. Therefore, even though the data center 302A has the same location 306A as the client 165A, the load balancer 304 selects the data center 302B from which the client 165A is to access the application because to avoid communication channels with high latency or load, which can adversely affect the flow of data therein and thereby degrade application performance. The load balancer 304 transmits the address of the data center 302B (STEP 406). The client 165A receives the address of the data center 302B, and establishes a connection to the data center 302B to access the application (STEP 408).

Similarly, the client 165B can submit a DNS query to the load balancer 304 (STEP 410). The DNS query can include the location 306B of the client 165B and the application for which the client 165B is requesting access. The load balancer 304 can select a data center for the client 165B to access the application (STEP 412). The load balancer 304 can identify a routing outage between the client 165B and the data center 302B. Therefore, even though the data center 302B has the same location 306B as the client 165B, the load balancer 304 selects the data center 302A from which the client 165B is to access the application to avoid outage that blocks access to data center 302B. The load balancer 304 transmits the address of the data center 302B (STEP 414). The client 165B receives the address of the data center 302A, and establishes a connection to the data center 302 to access the application (STEP 416).

Similarly, the client 165C can submit a DNS query to the load balancer 304 (STEP 418). The DNS query can include the location 306B of the client 165C and the application for which the client 165B is requesting access. The load balancer 304 can select a data center for the client 165C to access the application (STEP 420). The load balancer 304 can make a random decision to select data center 302A if relevant data or metrics are unavailable. The load balancer 304 transmits the address of the data center 302C STEP (422) because there is little or no data available to make determinations of prefer modes of application delivery. The client 165C receives the address of the data center 302A, and establishes a connection to the data center 302A to access the application (STEP 424).

Figure 5:
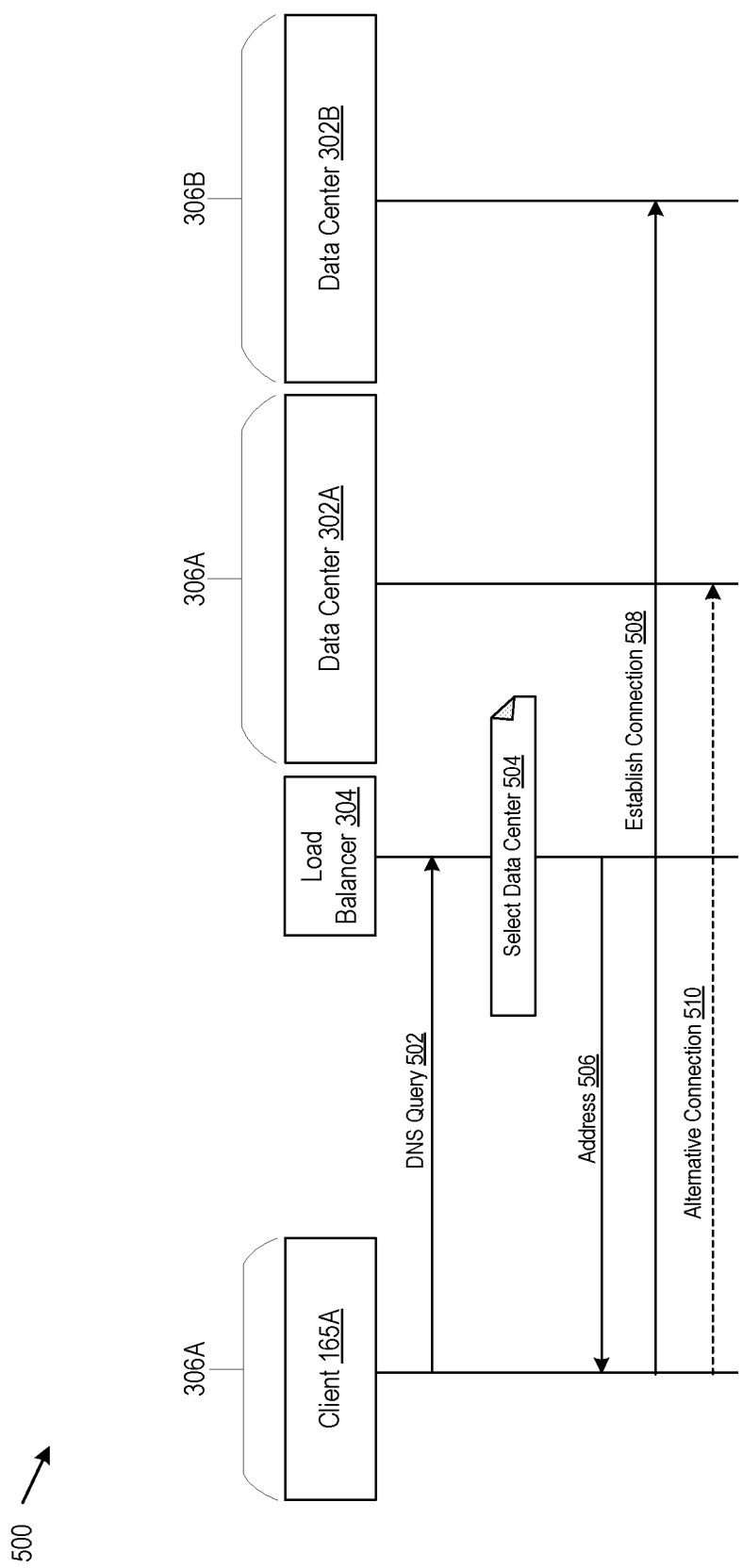
FIG. 5 is a diagram of a flow for mitigating localized application outage in accordance with an illustrative embodiment.

Referring now to FIG. 5, depicted is a diagram of a flow 500 for mitigating localized application outage, in accordance with an illustrative embodiment. Under flow 500, the client 165A can submit a DNS query to the load balancer 304 (STEP 502). The DNS query can include the location 306A of the client 165A and the application for which the client 165A is requesting access. The load balancer 304 can select a data center for the client 165A to access the application (STEP 504). The load balancer 304 can have the option to route the client 165A to the application via fixed connections (e.g., Digital Subscriber Line (DSL), copper, optical fiber, etc.) or mobile connections (e.g., 3G, 4G, LTE, 5G, etc.). For example, the fixed connection can be active (e.g., actively providing the application) and the mobile connection can be failover (e.g., a backup that can provide the application if the active connection fails). The load balancer 304 can determine that data (e.g., measurements or metrics) indicate if the active connection fails between the client 165A and the data center 302A, such as between an ISP and the data center 302A. For example, if there is a localized Internet connectivity issue that results in the application being temporally unavailable through the active fixed connection, then the load balancer 304 can use the data to identify this issue, and prompt the client 165 to switch to the failover mobile connection to enable application availability and/or access to the application. Therefore, even though the data center 302A has the same location 306A as the client 165A, the load balancer 304 selects the data center 302B from which the client 165A is to access the application. The load balancer 304 transmits the address of the data center 302B (STEP 506). The client 165A receives the address of the data center 302B, and establishes a connection to the data center 302B to access the application (STEP 508). However, if the location 306B of the data center 302B is in a remote geolocation, this selection may increase the application latency and may significantly degrade the experience for the client 165A. An alternative connection between the client 165A and the data center 302A can result in lower latency and thus an improved network experience, but the load balancer 304 may not recommend the alternative connection because of the network outage (STEP 510), since it is unaware of said alternative connection.

D. Systems and Methods for Routing Remote Application Data

Figure 6:
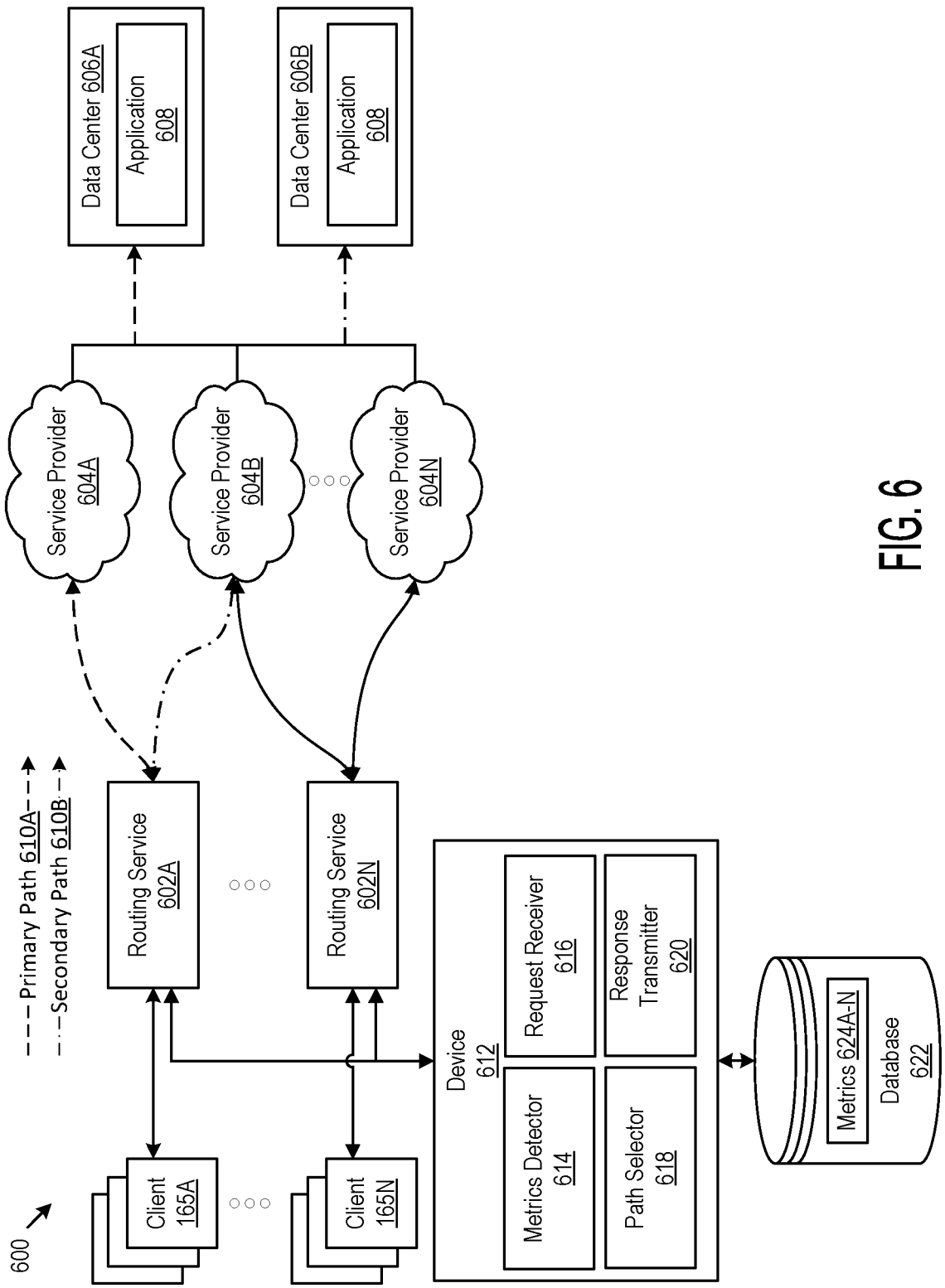
FIG. 6 is a block diagram of a system for application routing in accordance with an illustrative embodiment.

Referring now to FIG. 6, depicted is a block diagram of a system 600 for application routing, in accordance with an illustrative embodiment. In brief overview, the system 600 can include one or more clients 165A-165N (generally referred to as client 165), routing services 602A-602N (generally referred to as routing services 602), service providers 604A-604N (generally referred to as service providers 604), data centers 606A and 606B (generally referred to as data centers 606) hosting or otherwise providing an application 608, paths 610A-610B (generally referred to as paths 610), and a device 612 (e.g., a server). The clients 165 can communicatively couple to the routing service 602. The routing services 602 can communicatively couple to the service provider 604 and the device 612. The service providers 604 can communicatively couple to the data centers 606, which include, host, or otherwise provide the application 608. The device 612 can include a metrics detector 614, a request receiver 616, a path selector 618, and a response transmitter 620. The device 612 can communicatively couple to a database 622, which includes data or metrics 624A-N (generally referred to as metrics 624).

As described in greater detail below, the device 612 may be configured to receive a request to access an application 608, which is provided by a plurality of data centers 606 and accessible via one of the plurality of service providers 604. The device 612 may be configured to select a data center 606 from the plurality of data centers 606 and a service provider 604 from the plurality of service providers 604 based at least on a metric 624 indicative of a connection between the data center 606 and the service provider 604. The device 612 may be configured to transmit a response to the request from the client 165, which identifies the selected data center 606 and the selected service provider 604.

The routing service 602, the service provider 604, the data centers 606, the application 608, and the device 612 (including the metrics detector 614, the request receiver 616, the path selector 618, the response transmitter 620, and the database 622) can be implemented using components described in connection with FIGS. 1A, 1, and 2A-C. In some embodiments, the data center 606 may include, corresponds to, or be the resource feed 206, the resource feed service 220, or any combination thereof, among others. In some embodiments, the routing services 602 includes, correspond to, or is a resource management service 202, the gateway service 208, the SaaS service 210, or the identity provider 212, the identity service 218, or any combination thereof, among others. In another embodiment, a software-defined wide area network (SD-WAN) hardware appliance or an SD-WAN software implementation can implement the routing service 602.

Each of the above-mentioned elements or entities is implemented in hardware, or a combination of hardware and software, in one or more embodiments. Each component of the system 600 can be implemented using hardware or a combination of hardware or software detailed above in connection with FIGS. 1A, 1B, and 2A-2C. Each of these elements or entities can include any application, program, library, script, task, service, process or any type and form of executable instructions executing on hardware of the various components in system 600 (e.g., the metrics detector 614, the request receiver 616, the path selector 618, the response transmitter 620, and the database 622). The hardware includes circuitry such as one or more processors in one or more embodiments.

The routing services 602 can be configured to route, handle, or otherwise control network traffic between the clients 165 and the data centers 606 for accessing the application 608. The routing services 602 can be configured to direct the network flow among the service providers 604 and the data center 606. The routing services 602 can be configured to forward or route network flow through network nodes. The routing services 602 may be or include routers, gateways, firewalls, and/or network switches. In some embodiments, the routing services 602 may be or include a service which executes on a device, such as a router, gateway, network switch, or other device intermediary to a client 165 and a data center or server. The routing services 602 can be configured to route the network flow according to routing tables. The routing services 602 can be configured to route the network flow according to configurations of the routing tables by a network manager or administrator. The routing services 602 can be configured to observe and identify the network traffic to route the traffic accordingly. For example, the routing services 602 can be configured to apply routing protocols to route the network traffic. The routing services 602 can be configured to also perform IP routing or bridging. For example, the routing service 602 can be configured to route network traffic within a large network by relying on structured addresses to use IP routing from a routing table entry to represent a route to service providers 604 or data centers 606. In another example, the routing services 602 can be configured to route network traffic within a local area network by using unstructured addressing to rely on bridging. The routing service 602 can be configured to route the network traffic through the service providers 604.

The service provider(s) 604 can be or include an entity (such as a service provider company or enterprise) that provides network services to various clients 165. The service providers can communicate with the data centers 606. In some embodiments, the service providers 604 are internet service providers (ISP). The service providers 604 can be configured to provide internet access, internet transit, web hosting, or gateway services. The service providers 604 can be companies, providers, or any other service that enables network communications between the clients 165 and the data centers 606, which host, include, or otherwise provide an application 608. Some of the service providers 604 can be a default or active service provider 604 and associated with requests to access application 608. For example, the service providers 604 can facilitate the transmission of DNS requests from the clients 165 to the routing services 602.

The data centers 606 can be services, servers, computers, or related systems, devices, or components configured to process, store, network, manage, or distribute data for one or more resources or applications 608. The data centers 606 can include hardware such as computer nodes, server racks, and the like. In some embodiments, the data centers 606 can be a software-defined networking (SD-WAN) appliance, a computer, networking equipment, or service. The data centers 606 can have a network address (e.g., IP Address), an identifier (e.g., serial number), and/or a security certificate. The data centers 606 can be configured to communicate with the service providers 604. The data centers 606 can be configured to communicate with the service providers 604 via networking technologies such as LTE, WiMAX, DSL, cable, or MPLS. The data centers 606 can be pre-configured to provide the application 608. The data centers 606 can include software or firmware designed to provide a specific computing resource or service, such as the application 608. The data centers 606 can include one or more devices to control access to application 608.

The application 608 can include services or resources provided to the clients 165. The data centers 606 maintain, host, include, provision, or otherwise provide the application 608 to the clients 165. The application 608 may be accessible on the data centers 606 via the service providers 604. The application 608 may be provided by a plurality of data centers 606, as shown in FIG. 6. The application 608 shown as being included in data center 606A and data center 606B can be or include unique instances of the application 608. The application 608 can be part of a cloud-computing environment. The applications can also be micro-apps, virtual-assistant (VA), web applications, files, virtual Windows applications, virtual Linux applications, desktops, mobile applications, Citrix Virtual Apps and Desktops™, local applications, and other data.

The paths 610 shown in FIG. 6 represent a data path of network traffic between the routing services 602 and the application 608. The routing services 602 can route network traffic according to the paths 610. The paths 610 represent data flow between the service providers 604 and the data centers 606 between the routing services 602 and the application 608. The paths 610 can correspond to a network topology or a routing table. Different paths 610 can correspond to unique network pathways from the routing services 602 to the data centers 606 via the service providers 604. For example, the primary path 610A can correspond to network traffic traveling from the routing service 602A to the service provider 604A and to the data center 606A to access the application 608. Similarly, the secondary path 610B can correspond to network traffic travelling from the routing service 602A to the service provider 604B and to the data center 606B to access the application 608. The device 612 can define or configure the paths 610.

The device 612 can be a network administration device, a software defined wide-area network device, an intermediary device, or other hardware, which is configured to facilitate establishing of connections between the clients 165 and data centers 606. In some embodiments, a network administrator can manage the device 612. The device 612 can be located in a data center, a computer room, or any other remote location. The device 612 can be located in a physical location that is separate from the routing services 602. The device 612 can be configured to communicate with the clients 165, the routing services 602, the service providers 604, and the data centers 606.

The device 612 can include a metrics detector 614. The metrics detector 614 can be configured to identify, compile, determine, or otherwise manage metrics 624 relating to network traffic between various clients 165, network traffic on various service providers 605, and/or network traffic to various data centers 606. The metrics detector 614 can be configured to compile data or measurements from clients 165 accessing the application 608 into the metrics 624. In some embodiments, the metrics 624 include an availability of the service providers 604, latency of data accessed via a respective service provider 604 from a respective data center 606, and/or data throughput via the respective service provider 604 and the respective data center 606.

The metrics 624 can also include latency, network performance, duration, operating system, hardware, network latency, transmission delays, propagation delays, round trip time values, or connection reconnects and failures for each path 610 between the clients 165 and the data centers 606. The metrics detector 614 can identify a logon duration indicative of how much time the clients 165 established connections with the application 608. The latency can indicate processing delays relating to time it takes the service providers 604 or the data centers 606 to process packet headers and other data that constitutes the communications from the clients 165 to the application 608. The metrics detector 614 can identify queuing delays relating to time spent by the network traffic in routing queues of the service providers 604. The transmission delays can indicate time taken to transmit the network traffic by the service providers 604. The propagation delays can indicate time taken for the service providers 604 or data centers 606 to propagate the network traffic between the client 165 and the routing service 602. The round trip time values can indicate a duration of time between network traffic being transmitted from the clients 165 and the clients 165 to receive an acknowledgment of that network traffic. The number of connection reconnects and failures can indicate the number of times in which clients 165 and the application 608 lose their connection with one another and had to restart or reconnect. The metrics detector 614 can store the metrics 624 in the database 622.

The metrics detector 614 can manage, identify, or determine metrics 624 for individual paths 610. The metrics detector 614 can identify metrics 624 for individual subsets of the paths 610, such as from the client 165 to the data centers 606 and/or from the service providers 604 to the data centers 606. The metrics detector 614 can identify or determine a location of the service providers 604 and the data centers 606. While individual service providers 604 can refer to a combination of an ISP and its geolocation, the metrics detector 614 can identify any additional or separate locations of the service providers 604 as separate entities. The metrics detector 614 can also identify or select an application 608 for routing. The metrics detector 614 can select application 608 as service provider-aware, which represents application 608 accessible by the clients 165 via various service providers 604. By selecting the application 608 for routing, the metrics detector 614 can consider individual service providers 604 available to access the application 608. The metrics detector 614 can store such selections of application 608, and their corresponding names or identifiers (e.g., DNS names) and IP addresses, in the database 622.

The metrics detector 614 can generate, identify, obtain, access, or acquire data or metrics 624. In some embodiments, the metrics detector 614 can provide simulation content to the application 608 for acquiring the metrics 624. The simulation content can be a content item, a simulation file, or a simulation tool for acquiring metrics 624. The metrics detector 614 can provide the content item to the data center 606 that is hosting the application 608. The metrics detector 614 can provide the content item to the routing services 602 to route the content item across the paths 610 to simulate application access by the clients 165. The metrics detector 614 may be configured to obtain metrics 624 from data or measurements relating to routing, downloading, transmitting, receiving, or otherwise exchanging of the content item between the data center 606 and the routing service 602. The routing service 602, the data center 606, the application 608, or the clients 165 may be configured to provide, to the metrics detector 614, the data or measurements.

In some embodiments, the metrics detector 614 can transmit, to the application 608, a notification identifying an application Domain Name System (DNS) and target IP addresses to use for probing the application 608. In some embodiments, the metrics detector 614 can transmit instructions to the routing service 602 to cause the routing service 602 to detect and report network problems between the service providers 604 and the data centers 606. For example, the instructions can specify the problems to be network usage spikes, throttling, or bandwidth fluctuations. The metrics detector 614 can be configured to aggregate the received metrics 624 in the database 622.

The metrics detector 614 can associate, assign, or represent individual metrics 624 with different paths 610. The metrics detector 614 can identify individual service providers 604 accessible to the routing services 602. To represent or manage different combinations between the service providers 604 and the data centers 606, the metrics detector 614 can create an N×M matrix, wherein the N corresponds to service providers 604 and the M corresponds to data centers 606. In particular, individual N rows can correspond to one of the service providers 604, and individual M columns can correspond to one of the data centers 606. For example, the following table depicts an N×M matrix that represents metrics 624 for N-path routing services 602 for the application 608 available across M data centers 606.

TABLE 1

| NxM matrix that represents metrics 624 for N-path routing services 602 for the application 608 available across M data centers 606. | | |
| --- | --- | --- |
| | Data Center 606A | Data Center 606B |
| Service Provider 604A | val_1_1 | val_1_2 |
| Service Provider 604B | val_2_1 | val_2_2 |
| ... | | |
| Service Provider 604N | val_N_1 | val_N_2 |

The metrics (e.g., val_1_1, val_2_2, etc.) represent the corresponding paths 610 between the service providers 604 and the data centers 606. For example, val_1_1 corresponds to a metric indicative of accessing the application 608 on the data center 606A via the service provider 604A.

The path selector 618 can be configured to manage or store preferences of the clients 165 and the application 608 for the paths 610. The path selector 618 can receive the preferences from the clients 165, the application 608, the database 622, and/or network administrators. The preferences can be for types of service providers 604 (e.g., 4G, LTE, mobile network ISP, or wired network). For example, the path selector 618 can store a preference that specifies that the clients 165 or the application 608 prefer fixed-line ISPs instead of mobile network ISPs. In another example, the metrics detector 614 can store a preference that specifies that the clients 165 can use paths 610 that include mobile network ISPs if those paths 610 provide a latency that is at least 100 ms lower than latencies of paths 610 that use fixed-line ISPs. Similarly, the path selector 618 can indicate that the clients 165 or the application 608 prefer certain types of data centers 606 (e.g., those in certain jurisdictions or associated with certain power consumption costs).

The path selector 618 can store, manage, or receive thresholds associated with or otherwise assigned to the preferences for the paths 610. The thresholds indicate satisfactory differences between metrics 624 at which point the routing services 602 route according to the non-preferred paths 610 instead of preferred paths 610. The thresholds can include latency reductions, network speed increases, or any other network parameter defined by the metrics 624. For example, the threshold for latency reductions can be 25, 50, 75, 100, and/or 200 ms. The threshold for network speed increases can be 1, 2, 3, 4, 5, 10, 50, and/or 100 MB/s, for example. The path selector 618 can store the thresholds in the database 622 in association with the client 165, network administrator(s), routing service(s) 602, and so forth.

The request receiver 616 can receive, identify, or manage requests for clients 165 to access application 608. The requests can include parameters about the clients 165. For example, the parameters can indicate locations of the clients 165, an identifier (i.e., a serial number, an IP address, etc.) of the clients 165, and network capabilities (e.g., wired connection, 4G, 5G, etc.) of the clients 165. In certain embodiments, the device can determine the location of the routing services 602 based on an internet protocol (IP) address of the clients 165 communicably coupled to the routing service 602. The requests can include parameters about the application 608. For example, the parameters can include URL (which can include a Full Qualified Domain Name for identifying a location of the data centers 606 that can provide the applications 608) a name, security login, type, version, or any other parameters of the requested application 608. The requests can also include parameters defining the connection between the clients 165 and the application 608. For example, the parameters can include security settings, firewall settings, encryption protocols, maximum latency settings, or any other network connection parameter.

The metrics detector 614 can retrieve, identify, or determine metrics 624 associated with or otherwise indicated by the request. In some embodiments, the metrics detector 614 can query the database 622 to retrieve the metrics 624. For example, the metrics detector 614 can retrieve metrics 624 between the service providers 604 and the data centers 606 available to the clients 165 to access the requested application 608. In some embodiments, the metrics detector 614 can use the request to query the database 622 for metrics 624 relating to the application 608 identified in the request and a location of a routing service 602 transmitting the request. For example, the metrics detector 614 can retrieve metrics 624 for the service providers 604 and the data centers 606 that provide the requested application 608 in the location or region of the routing service 602 (e.g., by querying the database 622 using a location of the routing service 602, an identification of the service providers 604 in which the routing service 602 is configured to use, and/or an identifier for the application 608). As another example, the metrics detector 614 can retrieve metrics 624 for service providers 604 that are along the network path between the routing service 602 and a particular data center 606 hosting the application 608. In yet another example, the metrics detector 614 may retrieve metrics 624 for the data centers 606 that host the application 608.

The path selector 618 can select, identify, or specify paths 610 for the client 165 to use for accessing the application 608. The path selector 618 can select paths 610 that including one of the service providers 604 and one of the data centers 606. The path selector 618 can select the paths 610 based on the metrics 624 (e.g., metrics managed, maintained by, or otherwise included in the database 622). For example, the path selector 618 can select the paths 610 with the lowest latency as indicated by the metrics 624. By selecting the paths 610, the path selector 618 selects the service providers 604 and the data centers 606 (e.g., a service provider 604, data center 606 pair) for the clients 165 to use for accessing the application 608. In some embodiments, the path selector 618 selects the service providers 604 and the data centers 606 based on the metrics 624 between the service providers 604 and the data centers 606.

The path selector 618 can select, identify, or specify paths 610 based on whether the paths 610 use the preferred or not preferred service providers 604 or data centers 606 based on the preferences, such as ones included in the database 622. For example, the preferences may include a preferred service provider 604 for specific applications, specific locations in which the client 165 is located, and so forth. The preferences may be provided by a user of the client 165, a network administrator, and so forth. The path selector 618 can select paths 610 based on the metrics 624 satisfying thresholds for the preferences included in the database 622, maintained by the device 612, or otherwise accessible by the device 612. The path selector 618 can compare the metrics 624 between the paths 610, determine whether the differences satisfy the thresholds, and determine which of the paths 610 to use for communications between the clients 165 and the application 608. For example, the path selector 618 can select paths 610 that are not preferred if the metrics 624 for the non-preferred paths 610 indicate a reduction in latency of at least 100 ms compared to the metrics 624 of the preferred paths 610. Similarly, the path selector 618 can select paths 610 that are not preferred if the metrics 624 for the non-preferred paths 610 indicate an increase in network speed of at least 10 MB/s compared to the metrics 624 of the preferred paths 610.

The response transmitter 620 can generate or create responses to the requests received by the request receiver 616 to access the application 608. Based on the selected paths 610, the response transmitter 620 can identify the service providers 604 and the selected data centers 606 for the clients 165 to use for accessing the application 608. The response transmitter 620 can be configured to generate a response that indicates the selected service providers 604 and the selected data centers 606. In some embodiments, the response transmitter 620 can be configured to generate instructions that include the selected service providers 604 to access the selected data center 606 to access the application 608. The response transmitter 620 can generate the instructions to cause the routing service 602 to use the selected service providers 604 to access the selected data center 606 to access the application 608.

The response transmitter 620 can transmit, send, or otherwise provide the response to the routing services 602 to identify the selected service providers 604 and the selected data centers 606. The response transmitter 620 can transmit the responses via an application-programming interface (API). The API can be an interface of the routing services 602 for configuration by the response transmitter 620. The response transmitter 620 can transmit API calls via the API to configure the routing services 602. The API calls can include the instructions to configure the routing services 602. In certain embodiments, the response transmitter 620 can transmit the instructions to the routing service 602 to cause the routing service to select the selected service providers 604 and the selected data centers 606. In some embodiments, the response includes a table including the metrics 624 for the service providers 604 in relation to the data centers 606. For example, the response can include the N×M matrix described above with respect to Table 1. In this embodiment, the routing services 602 may be configured to use the response (i.e., the N×M matrix) to determine the service provide 604 and data center 606 for which the client 165 is to access the application 608.

In some embodiments, the response transmitter 620 can be configured to transmit, send, or otherwise provide the preferences and thresholds to the routing services 602 (e.g., accompanying the response, subsequent to the response, and/or prior to the response). The response transmitter 620 can generate instructions for configuring the routing services 602 to select the paths 610 based on the preferences and thresholds. The response transmitter 620 can configure the routing services 602 to use the preferences and thresholds if the routing services 602 receive the paths 610 from an entity other than the device 612. For example, the routing services 602 can receive the paths 610 from a network administrator or the load balancer 304. The response transmitter 620 can configure the routing services 602 to use the preferences and thresholds to determine whether to use paths 610 using non-preferred service providers 604 or data centers 606.

The database 622 can be configured to store, maintain, or otherwise manage data relating to the application routing, such as the metrics 624. The database 622 can be any type and form of database or data storage configured to store metrics 624 or any other electronic record. The database 622 can store mappings or associations among the service providers 604, the data centers 606, and the metrics 624. For example, each of the metrics 624 can represent network traffic parameters between the service providers 604 and the data centers 606 hosting applications 608. The database 622 can store mappings and associations among the clients 165, the routing services 602, the service providers 604, the data centers 606, and the metrics 624.

Figure 7:
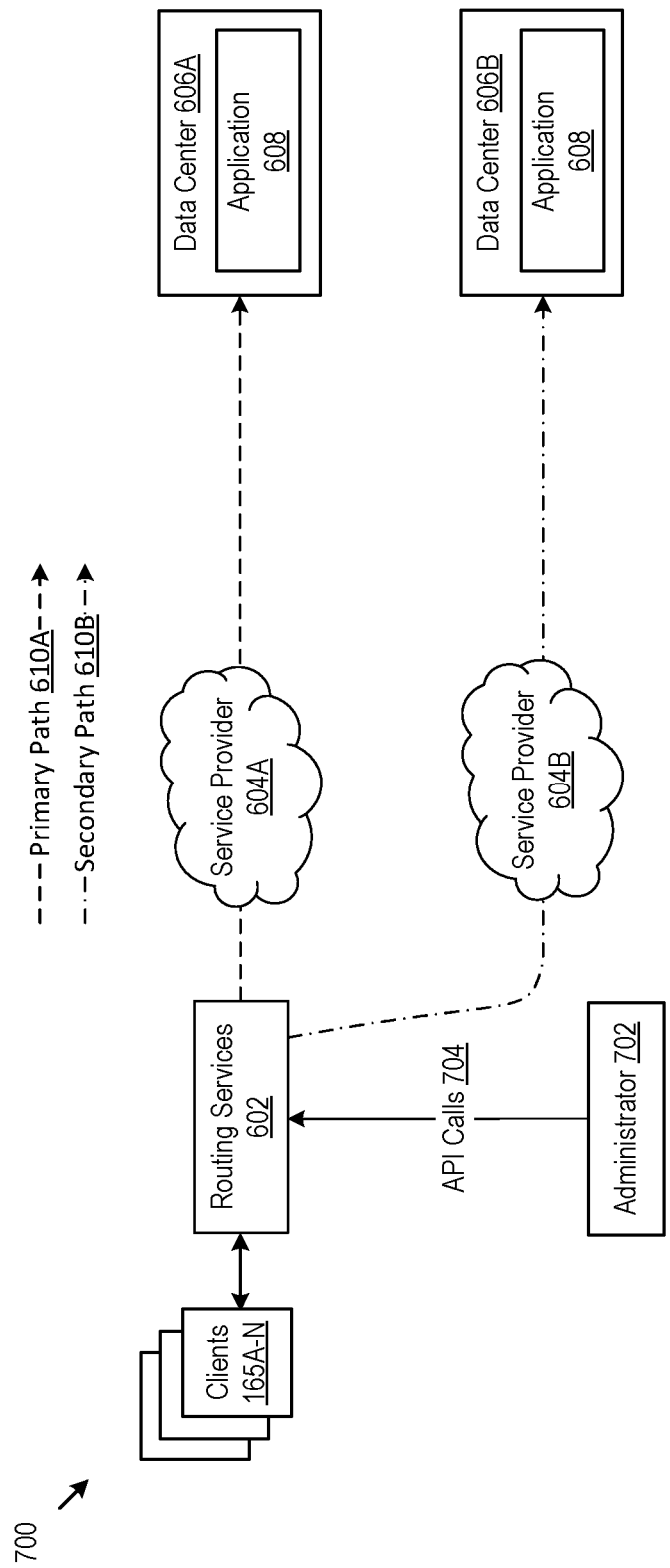
FIG. 7 is a diagram of a flow for configuring a routing service in accordance with an illustrative embodiment.

Referring now to FIG. 7, depicted is a diagram of a flow 700 for administrators to configure the routing service 602, in accordance with an illustrative embodiment. The flow 700 can include an administrator 702. The administrator 702 can be a device operated, controlled, or otherwise used by a person or entity designated to maintain or manage networking infrastructure. The administrator 702 can configure the routing services 602 by modifying the paths 610 according to which the routing services 602 route network traffic between the clients 165 and the application 608. The administrator 702 can configure the routing service 602 by making or transmitting API calls (STEP 704). The administrator 702 can transmit the API calls via the API established by the routing service 602 to configure the routing of network traffic between the clients 165 and the application 608. For example, the API can enable the administrator 702 to configure paths 610, select preferred paths 610, or perform network simulations to acquire metrics 624.

Figure 8:
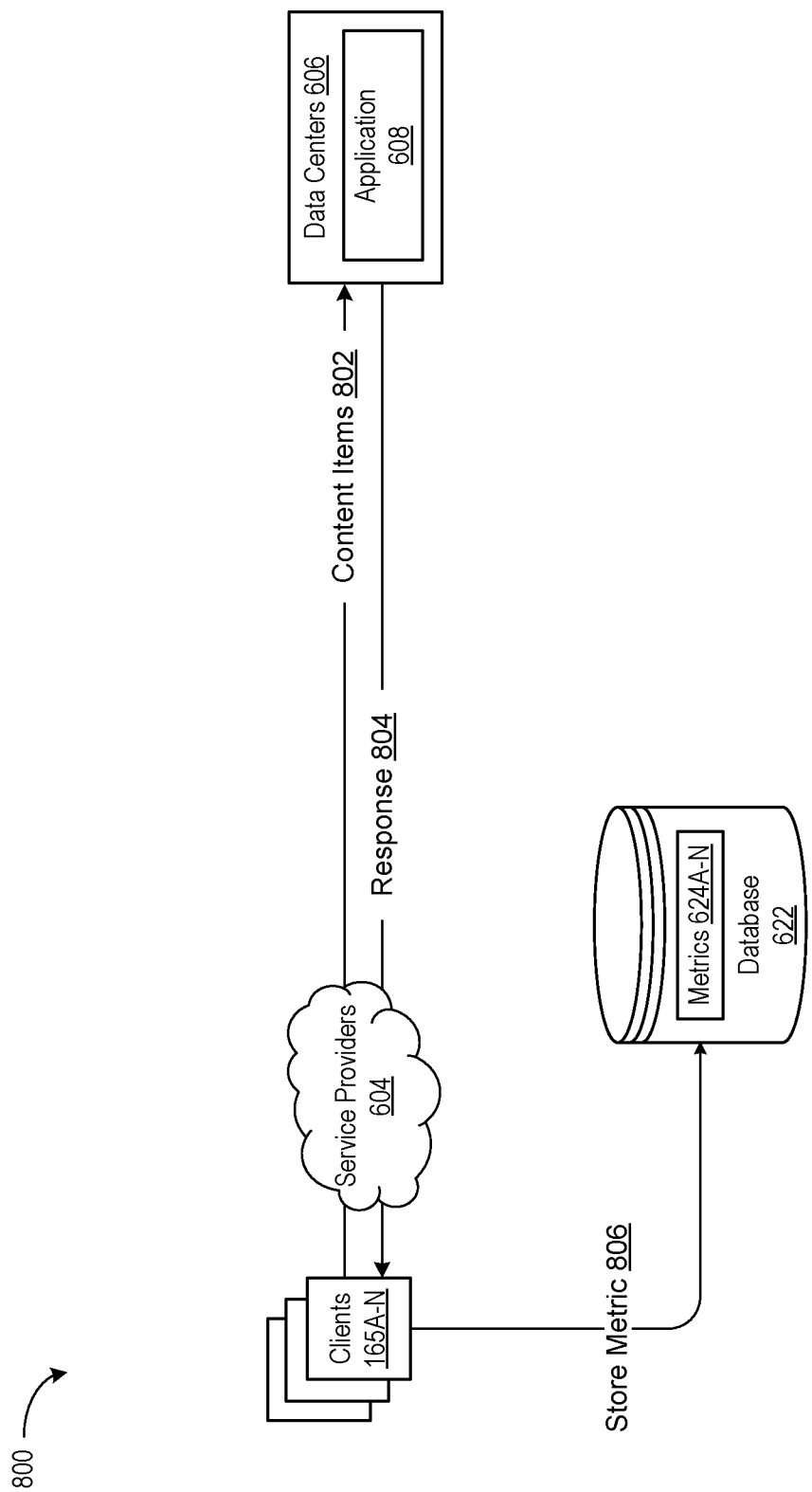
FIG. 8 is a diagram of a flow for data acquisition in accordance with an illustrative embodiment.

Referring now to FIG. 8 and in brief overview, depicted is a diagram of a flow 800 for data acquisition for metrics relating to one or more paths 610 accessed by one or more clients, in accordance with an illustrative embodiment. Under the flow 800, the clients 165 can transmit requests for a content item(s) of the application 608 (STEP 802). The clients 165 can receive a response (STEP 804). The database 622 can store the metrics 624 (STEP 806).

Still referring to FIG. 8 and in further detail, the clients 165 can transmit a request for content items to the application 608 (STEP 802). In some embodiments, the content items may be or include a data packet, simulation file, or other data string, which is used for obtaining metrics 624 relating to the application 608. In some embodiments, the content item may be provided to the application 608 (i.e., to a developer of the application 608) by an entity associated with the device 612. In some embodiments, the content item may be a content item, which is maintained by all applications (e.g., a generic content item, such as a logo, a smaller version, or other small data packet or file). The clients 165 can access the applications deployed on the data centers 606, and these clients 165 can provide metrics 624 of one or more paths 610 to the metrics detector 614. The clients 165 can transmit the request for the content item via the service providers 604 and to the data centers 606 with the application 608. The clients 165 can receive a response (STEP 804). The response can include the content item. The clients 165 (or the routing services 602) may be configured to determine metrics 624 based on the response. For example, the client 165 and/or routing services 602 may be configured to determine the response indicates that the application latency is 37 ms (i.e., a latency determined based on a difference between the request and the response). The device 612 may be configured to receive the metrics 624 from the request and/or the response. The device 612 can be configured to store or otherwise incorporate the metrics 624 in the database 622 (STEP 806). The database 622 can therefore store the metrics 624 for metrics detector 614 to create a reachability "map," N×M matrix, or data defining paths 610 between the service providers 604 and the data centers 606.

Referring now to FIG. 9 and in brief overview, depicted is a diagram of a flow 900 for application routing, in accordance with an illustrative embodiment. Under the flow 900, the metrics detector 614 can receive and/or retrieve metrics 624 from the database 622 (STEP 902). The response transmitter 620 can configure the routing services 602 by transmitting API calls via the API (STEP 904).

Still referring to FIG. 9 and in further detail, the metrics detector 614 can receive or retrieve metrics 624 from the database 622 (STEP 902). The path selector 618 can use the metrics 624 to select paths 610 for routing the clients 165 to the application 608. The response transmitter 620 can configure the routing services 602 by transmitting API calls via the API of the routing services 602 (STEP 904). The API calls can include the paths 610 for routing network traffic between the clients 165 and the application 608. For example, the API calls can specify the primary path 610A, the secondary path 610B, a path 610C, and a path 610D. The path 610C can route the clients 165 to the service provider 604B and to the data center 606A to access the application 608. The path 610D can route the clients 165 to the service provider 604B and to the data center 606B to access the application 608. The API calls can also specify which paths 610 apply to which clients 165 and application 608. For example, some clients 165 or application 608 communicate via wired connections but not wireless connections, so the API calls specify that paths 610 that include service providers 604 using on a wired connection apply to those clients 165 and application 608. Similarly, the response transmitter 620 can configure the routing services 602 for a list of application 608. For example, the API calls can include DNS names of the application 608 routed by the routing services 602. The response transmitter 620 can mark the application 608 as service provider-aware. The routing services 602 can route clients 165 via different service providers 604 to access application 608 that are service provider-aware. By configuring the routing services 602, the clients 165 can access the application 608 via a variety of paths 610. For example, the routing services 602 can route clients 165 via the paths 610A-610D to access the application 608.

Figure 10A:
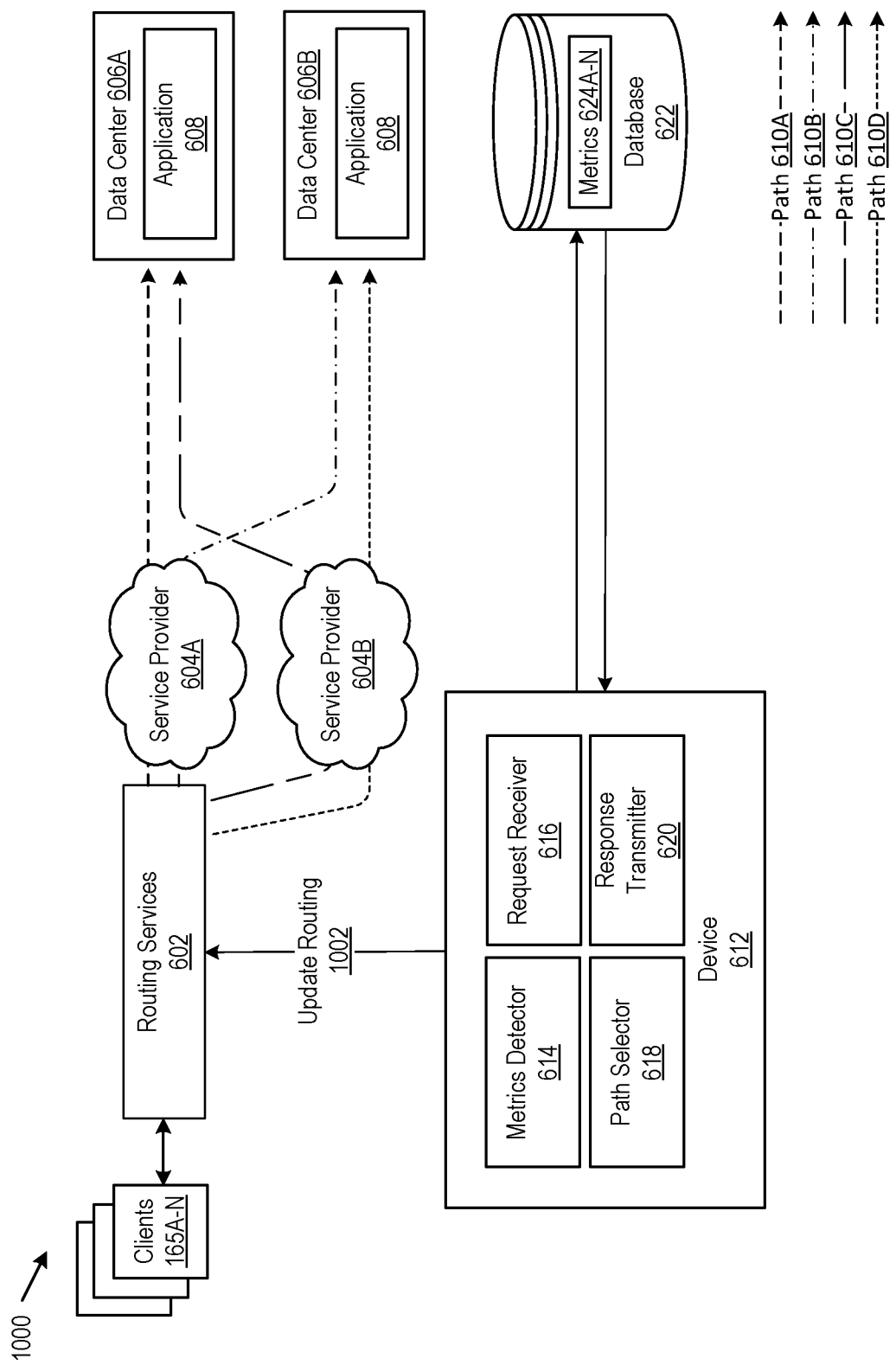
FIG. 10A is a diagram of a flow for routing in accordance with another illustrative embodiment.
Figure 10B:
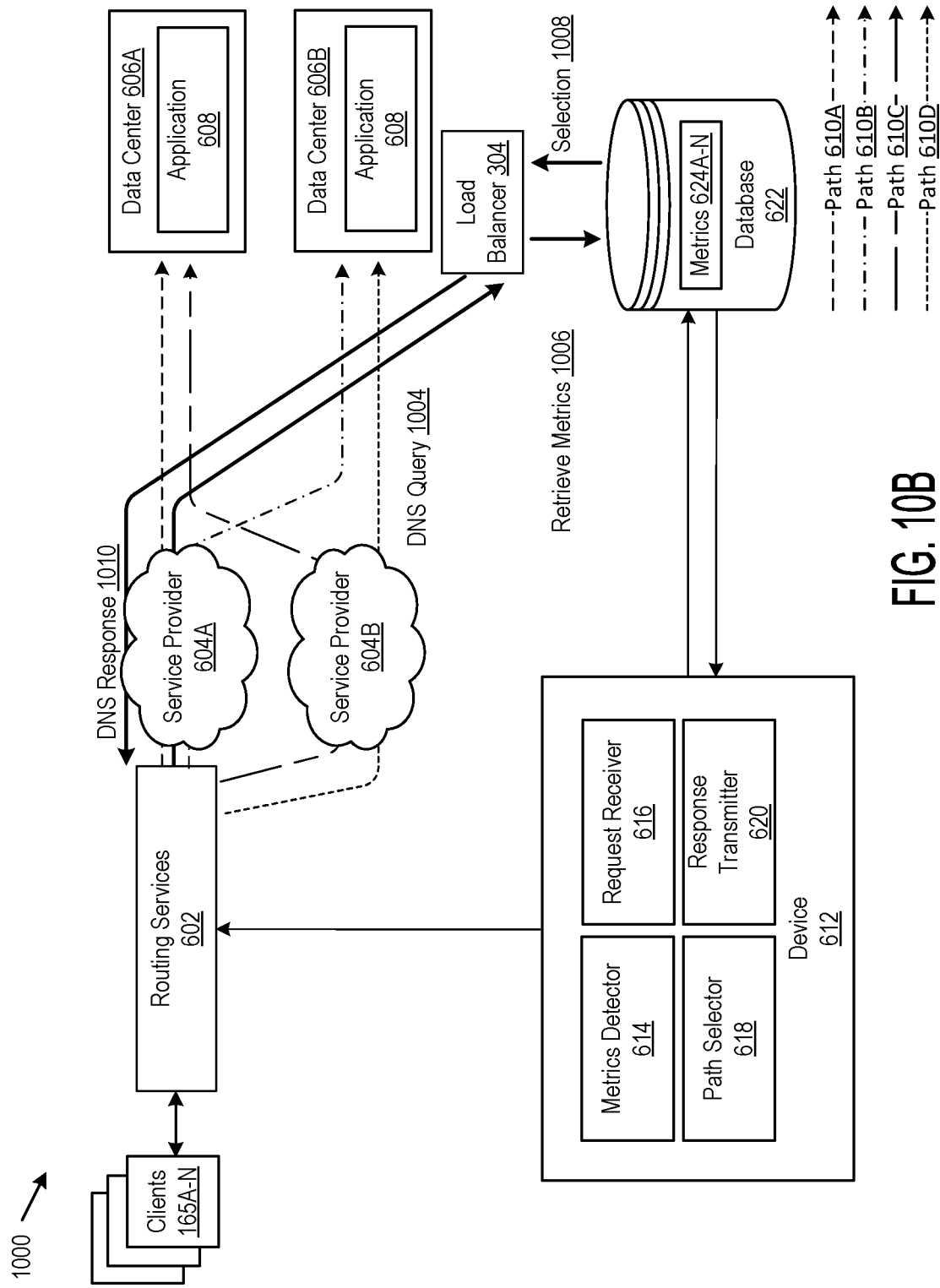
FIG. 10B is a diagram of a flow for application routing in accordance with yet another illustrative embodiment.
Figure 10C:
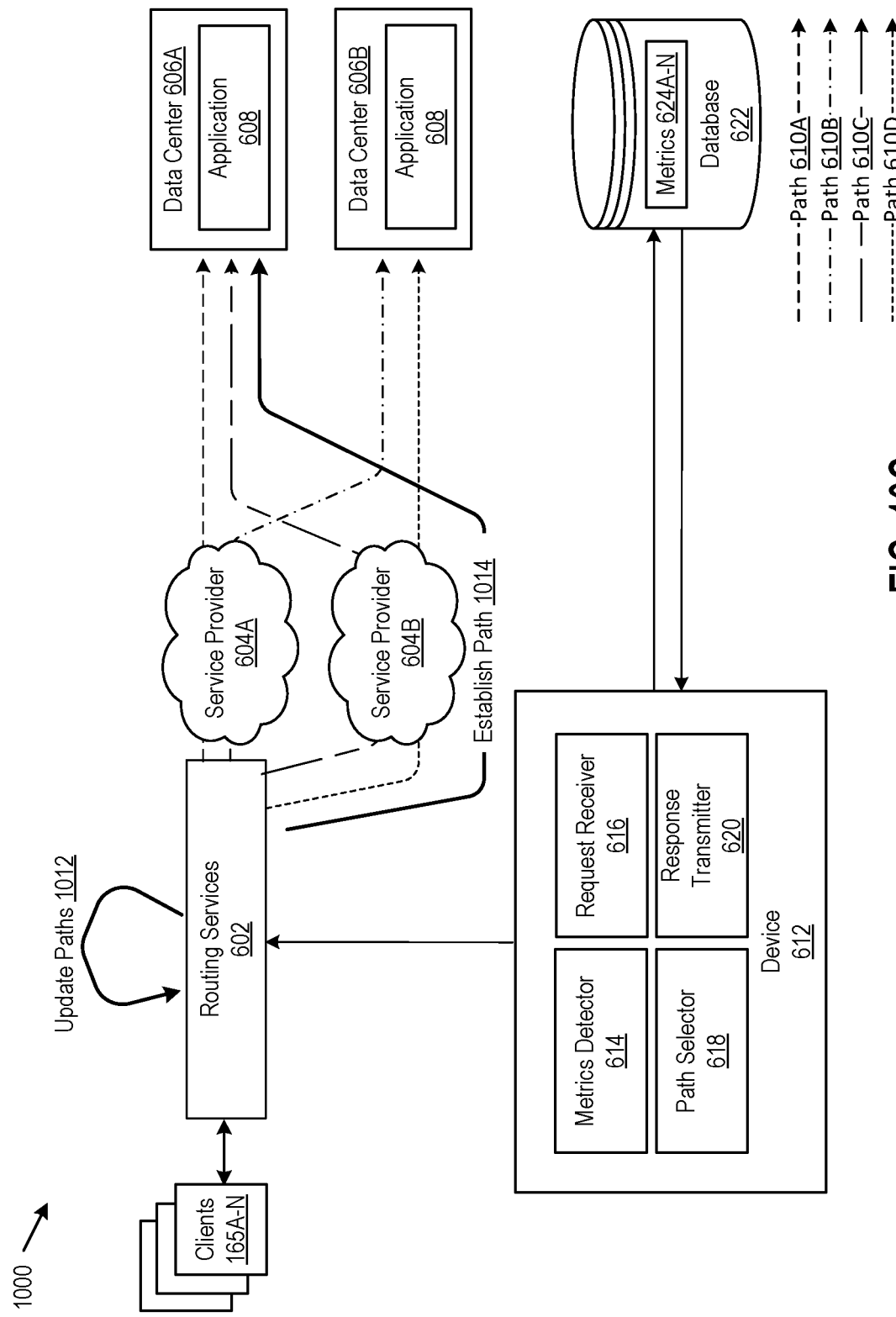
FIG. 10C is a diagram of a flow for updating application routing in accordance with yet another illustrative embodiment.

Referring now to FIGS. 10A-10C and in brief overview, depicted are diagrams of a flow 1000 for application routing, in accordance with another illustrative embodiment. Under flow 1000, the response transmitter 620 can update the routing of network traffic to and from application 608 (STEP 1002). The routing services 602 can submit DNS queries to the load balancer 304 (STEP 1004). The load balancer 304 can retrieve metrics 624 for paths 610 available to access the application 608 (STEP 1006). The load balancer 304 can select paths 610 for accessing the applications (STEP 1008). The load balancer 304 can transmit the selected paths 610 to the routing services 602 as a DNS response (STEP 1010). The routing services 602 can update paths 610 (STEP 1012). The routing services 602 can establish the paths 610 for the clients 165 to access the application 608 (STEP 1014).

Referring now to FIG. 10A and in further detail, depicted is a diagram of the flow 1000 for routing in accordance with another illustrative embodiment. The response transmitter 620 can update the routing of network traffic to and from application 608 (STEP 1002). The response transmitter 620 can update the routing for application 608 marked as service provider-aware. The response transmitter 620 can update paths 610 for the clients 165 to access the application 608. The response transmitter 620 can select which clients 165 can use which paths 610. Similarly, the response transmitter 620 can select which application 608 can use which paths 610. For example, the clients 165 or the application 608 can have rules specifying types of service providers 604 (e.g., cellular or wired) via which to establish access to the application 608 from the clients 165. Similarly, the clients 165 or the application 608 can have rules specifying locations (e.g., USA or Europe) of service providers 604 or data centers 606 via which to establish access to the application 608 from the clients 165.

Referring now to FIG. 10B and in further detail, depicted is a diagram of the flow 1000 for application routing in accordance with yet another illustrative embodiment. Under the flow 1000, the routing services 602 can submit DNS queries to the load balancer 304 (STEP 1004). The routing services 602 can submit the DNS queries to the load balancer 304 to determine the paths 610 for providing access to the application 608 for the clients 165. The routing services 602 can submit the DNS queries based on requests received from the clients 165 to access the application 608. The DNS queries can specify the application 608 that the clients 165 are to access. By configuring the routing services 602 to route clients 165 to the application 608 available via different service providers 604, the routing services 602 can enrich or otherwise modify the requests from the clients 165 into enriched or modified DNS queries. The routing services 602 can enrich the DNS query for individual domains associated with or otherwise assigned to the application 608. The enrichment can specify that the application 608 is accessible via different service providers 604. The enrichment may provide the load balancer 304 with data to consider routing the clients 165 across different service providers 604 and different data centers 606, instead of just via different data centers 606 accessible from one of the service providers 604 that correspond to the source IP of the clients 165 submitting the DNS request. To enrich the DNS request, the routing services 602 can identify the application 608 specified in the DNS request from the clients 165. For example, the requests from the clients 165 can specify with which application 608 the clients 165 are requesting access. The routing services 602 can provide metadata or other information for enriching or modifying the DNS requests for all the service providers 604 associated with or assigned to the routing services 602. The routing service 602 can also omit service providers 604 that are unavailable. For example, the service providers 604 can omit service providers 604 that are offline or that cannot provide access to the requested applications.

The load balancer 304 can retrieve metrics 624 for paths 610 available to access the application 608 (STEP 1006). The load balancer 304 can retrieve the metrics from the database 622. The load balancer 304 can retrieve the metrics that correspond to the service providers 604 and the data centers 606 that make up individual paths 610 for accessing the application 608. The load balancer 304 can retrieve the metrics 624 for paths 610 available to clients 165 having the source IP associated with the DNS query. The load balancer 304 can select paths 610 for accessing the applications (STEP 1008). The load balancer 304 can select paths 610 based on the metrics 624 associated with those paths 610. For example, the load balancer 304 can select paths 610 that provide the lowest latency for the clients 165 to access the application 608. The load balancer 304 can transmit the selected paths 610 to the routing services 602 as a DNS response (STEP 1010). The DNS response can be a response to the DNS query received from the routing services 602. The DNS response can include at least one of the paths 610 for the clients 165 to access the application 608. The DNS response can indicate the service providers 604 and the data centers 606 the clients 165 can use to access the application 608. The DNS response can also include metadata or matrix information associated with selecting the paths 610. For example, the enriched response can include the pairings between the data centers 606 and the service providers 604, and contents from the routing tables, such as metrics 624 of the N×M matrix for individual paths 610.

Referring now to FIG. 10C and in further detail, depicted is a diagram of the flow 1000 for updating application routing in accordance with yet another illustrative embodiment. The routing services 602 can update the paths 610 (STEP 1012). The routing services 602 can receive the DNS response from the load balancer 304. The DNS response can be the enriched response. The routing services 602 can use the enriched response to update its internal database to specify or override paths 610. The routing services 602 can identify, in the DNS response, the paths 610 for routing the clients 165 to access the application 608. The routing services 602 can update its routing protocols with the identified paths 610. The routing services 602 can route the clients 165 to the application 608 based on the paths 610. The routing services 602 can establish the paths 610 for the clients 165 to access the application 608 (STEP 1014). For example, the routing services 602 can establish a path from the service provider 604B to the data center 606A to access the application 608. The routing services 602 can apply the enriched response in certain conditions.

The routing services 602 can determine whether to use the selected paths 610 based on preferences (e.g., predetermined preferences) of the clients 165 and the application 608 for the paths 610. The routing service 602 can receive the preferences from the response transmitter 620. The preferences can be for types of service providers 604 (e.g., mobile network ISP or wired network). For example, the routing services 602 can identify that the clients 165 or the application 608 prefer fixed-line ISPs instead of mobile network ISPs. Similarly, the routing services 602 can identify that the clients 165 or the application 608 prefer certain types of data centers 606 (e.g., those in certain jurisdictions or associated with certain power consumption costs). Therefore, the routing services 602 can decide to use paths 610 that use preferred service providers 604 or data centers 606, and decline to use paths 610 that use non-preferred service providers 604 or data centers 606.

The routing services 602 can use the selected paths 610 based on the metrics 624 satisfying thresholds for the preferences. The routing services 602 can receive the thresholds for applying the paths 610 from the response transmitter 620. Thresholds can include latency reductions, network speed increases, or any other network parameter defined by the metrics 624. The routing service 602 can compare the metrics 624 of the paths 610 in view of the thresholds to determine which of the paths 610 to use for communications between the clients 165 and the application 608. For example, the routing services 602 can use paths 610 that are not preferred if the metrics 624 for the non-preferred indicate a reduction in latency of at least 100 ms compared to the metrics 624 of the preferred paths 610. Similarly, the routing services 602 can use paths 610 that are not preferred if the metrics 624 for the non-preferred paths 610 indicate an increase in network speed of at least 10 MB/s compared to the metrics 624 of the preferred paths 610.

Figure 11:
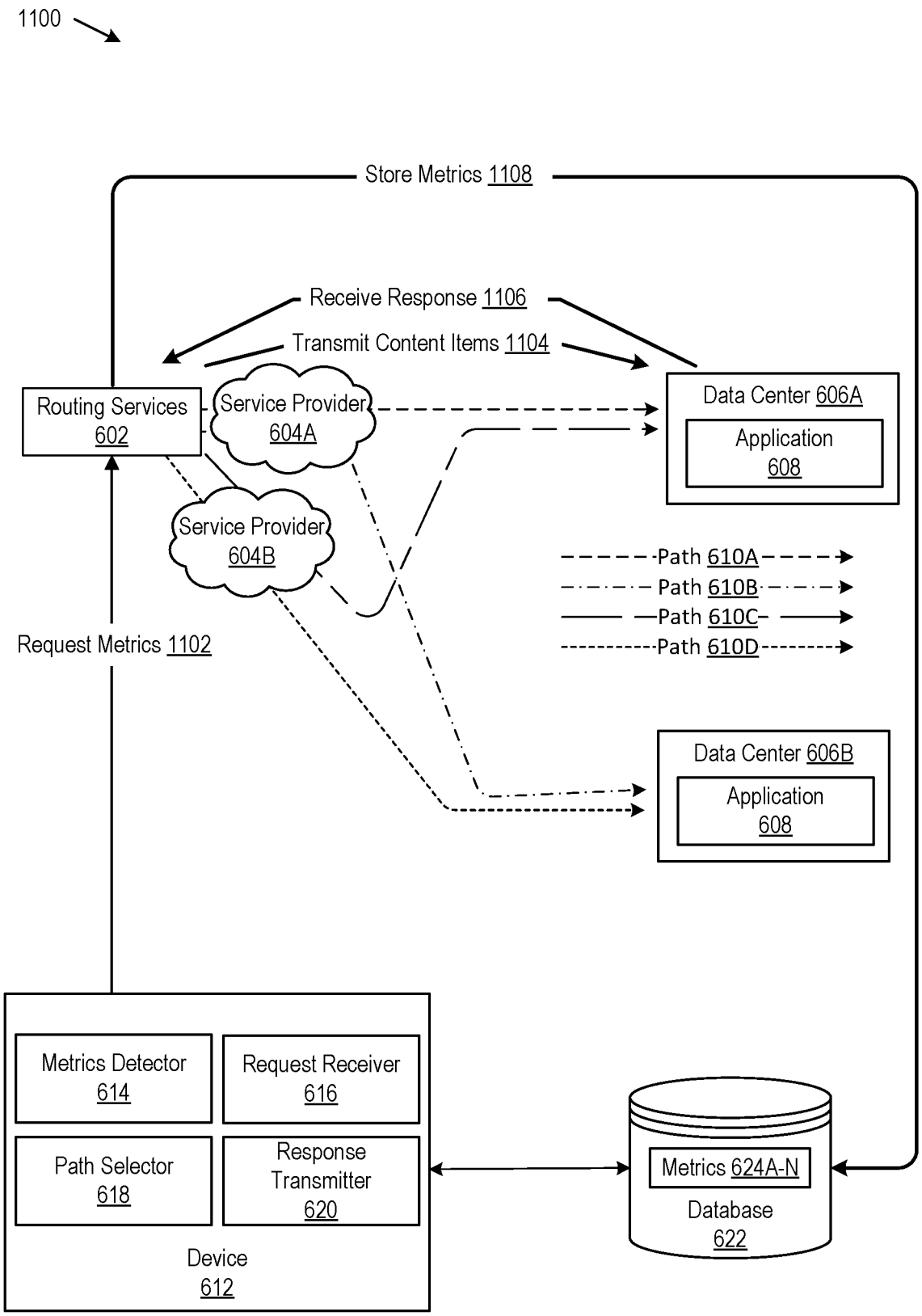
FIG. 11 is a diagram of a flow for acquiring data for application routing in accordance with an illustrative embodiment.

Referring now to FIG. 11 and in brief overview, depicted is a diagram of a flow 1100 for acquiring data for application routing, in accordance with an illustrative embodiment. Under the flow 1100, the response transmitter 620 can request metrics 624 from the routing services 602 for the paths 610 between the clients 165 and the application 608 (STEP 1102). The routing services 602 can transmit the content items to the application 608 (STEP 1104). The routing services 602 can receive a response (STEP 1106). The routing services 602 can store the metrics 624 in the database 622 (STEP 1108).

Still referring to FIG. 11 and in further detail, the response transmitter 620 can request metrics 624 from the routing services 602 for the paths 610 between the clients 165 and the application 608 (STEP 1102). The requests can be to measure access to application 608 or benchmark objects (e.g., content items) residing in an environment of the application 608. The metrics detector 614 can select application 608 for which to acquire metrics 624. The request can include the application 608 and their respective DNS domains and IP addresses of their respective data centers 606. In some embodiments, the metrics detector 614 can generate content items for the routing service 602 to transmit to acquire the metrics 624. In some embodiments, the metrics manager 614 can generate content items for the application 608 (i.e., to include or otherwise reside in an environment of the application 608). The metrics detector 614 can programmatically generate content items from individual application 608 to generate the metrics 624. The response transmitter 620 can transmit the content items to the routing services 602 (or to the application 608). The response transmitter 620 can transmit instructions to the routing services 602 for the routing services 602 to transmit the metrics 624 to the database 622.

In some embodiments, the routing services 602 can transmit the content items to the application 608 (STEP 1104). The routing services 602 can transmit the content item via the service providers 604 and to the data centers 606 providing the application 608. The content items can include a beacon or any other simulation file to acquire metrics 624. The routing services 602 can receive a response (STEP 1106). The routing services 602 can determine the metrics 624 from the response. For example, the response can indicate that the application latency is 50 ms and that the network speed is 100 MB/s. The routing services 602 can maintain an N×M reachability and latency matrix, which can complement the one stored in the database 622. In some embodiments, the device 612 can pre-populate the N×M matrix in the routing services 602. Pre-populating can offload the overhead of the DNS manipulation of the device 612, which can retrieve the metrics 624 and update the routing services 602. The routing services 602 or the device 612 can use the acquired metrics 624 to complement metrics 624 acquired from the clients 165. The routing services 602 can mitigate network issues, such as outages of any of the service providers 604 or data centers 606, by relying on metrics 624 acquired in a simulation environment (e.g., from the content items) and a use environment (e.g., from the clients 165, flow 800, etc.). The routing services 602 or the device 612 can use both types of metrics 624 to optimize the connection path 610. For example, a localized (e.g., city-wide) latency spike might not be identified from the metrics 624 acquired from the clients 165, but can be identified by the metrics 624 acquired by the routing services 602. The routing services 602 can store the metrics 624 in the database 622 (STEP 1108). The routing services 602 can transmit the metrics 624 to the database 622 for storage.

Figure 12:
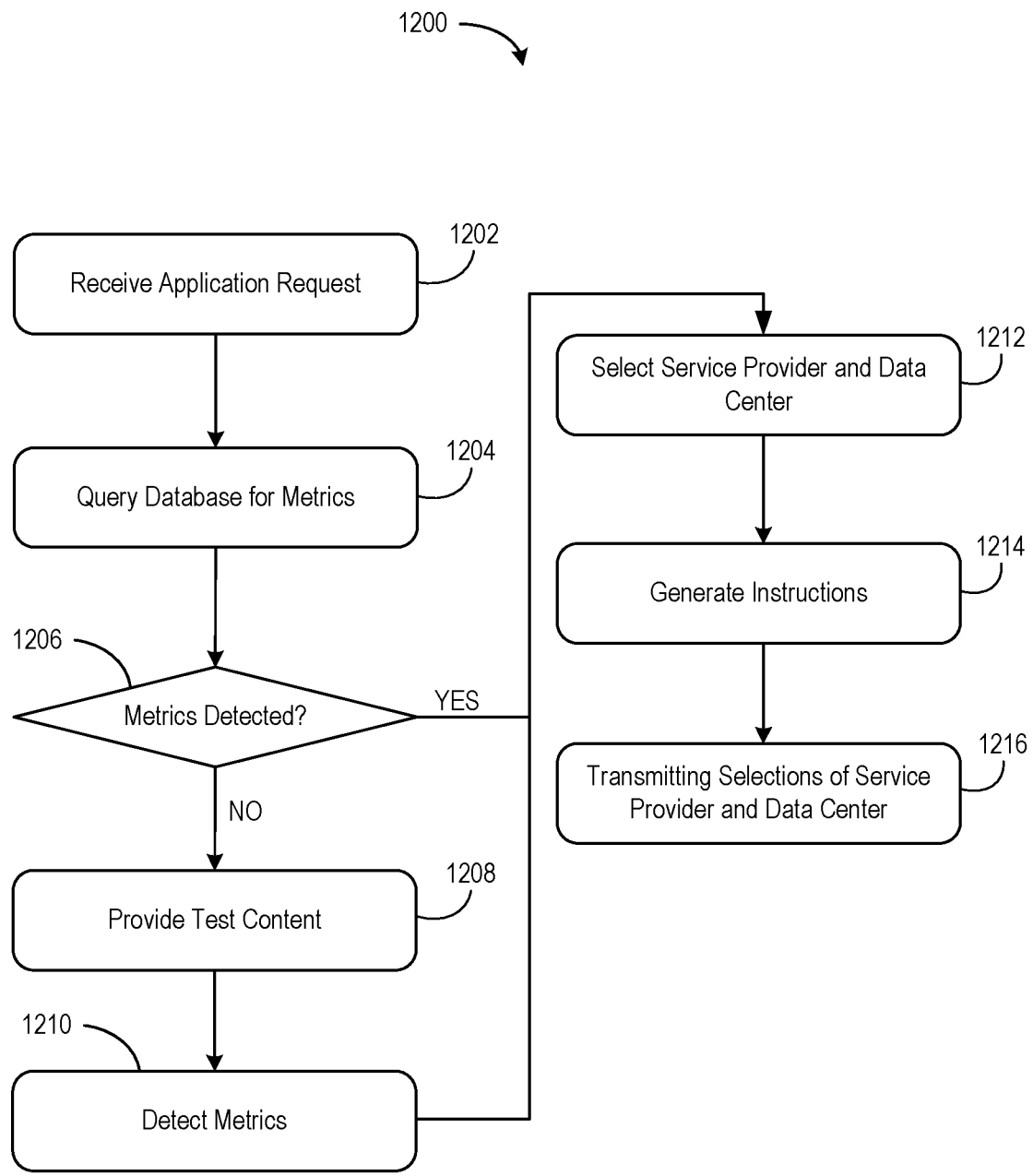
FIG. 12 is a diagram of a method for application routing in accordance with yet another illustrative embodiment.

Referring now to FIG. 12 and in brief overview, depicted is a diagram of an embodiment of a method 1200 for application routing in accordance with yet another illustrative embodiment. The components described in FIGS. 1-11, and/or the system 600 detailed above can perform the operations and functionalities of the method 1200. In brief overview, a device can receive an application request (STEP 1202). The device can query the database for metrics (STEP 1204). The device can detect metrics (STEP 1206). If device does not detect the metrics, then the method 1200 can proceed to provide simulation content (STEP 1208). The device can detect metrics from the simulation content (STEP 1210). If the device detects metrics in STEP 1206 or STEP 1210, then the device can select a service provider and a data center (STEP 1212). The device can generate instructions to select the service provider and data center (STEP 1214). The device can transmit the selection of the service provider and the data center (STEP 1216).

Referring now to FIG. 12 and in further detail, the device can receive an application request (STEP 1202). A device (e.g., device 612) can receive, identify, or manage a request to access an application (e.g., application 608). The requests can include parameters about the clients. For example, the parameters can indicate locations of the clients, the serial numbers of the clients, and network capabilities (e.g., wired connection, 4G, 5G, etc.) of the clients, and the like. In certain embodiments, the device can determine the location of the routing services based on an internet protocol (IP) address of the clients communicably coupled to the routing services. The requests can include parameters about the application. For example, the parameters can include a name, security login, type, version, or any other parameters of the requested application. The requests can also include parameters defining the connection between the clients and the application. For example, the parameters can include security settings, firewall settings, encryption protocols, maximum latency settings, or any other network connection parameter.

The device can be a network administration device, a software package, a user interface, or a combination thereof. A network administrator can manage the device. The device can be located in a data center, a computer room, or any other remote location. The device can be located in a physical location that is separate from the routing services. The device can communicate with the clients, the routing services, the service providers, and the data centers.

In some embodiments, the device can receive the request from a router (e.g., routing service 602). The routing services can route, handle, or otherwise control network traffic between the clients and the data centers for accessing the applications. The routing services can direct the network flow among the service providers and the data center. The routing services can forward or route network flow through network nodes. The routing services can include routers, gateways, firewalls, or network switches. The routing services can route the network flow according to routing tables. The routing services can route the network flow according to configurations of the routing tables by a network manager or administrator. The routing services can observe and identify the network traffic to route the traffic accordingly. For example, the routing services can apply routing protocols to route the network traffic. The routing services can also perform IP routing or bridging. For example, the routing service can route network traffic within a large network by relying on structured addresses to use IP routing to allow a routing table entry to represent a route to service providers or data centers. In another example, the routing services can route network traffic within a local area network by using unstructured addressing to rely on bridging. The routing service can route the network traffic through the service providers and to the data centers along paths.

The device can query the database (e.g., database 622) for metrics (e.g., metrics 624) (STEP 1204). The device can associate, assign, or represent individual metrics with different paths. The metrics manager can identify individual service providers accessible to the routing services. To represent or manage different combinations between the service providers and the data centers, the device can create an N×M matrix, wherein the N corresponds to service providers and the M corresponds to data centers. In particular, individual N rows can correspond to one of the service providers, and individual M columns can correspond to one of the data centers.

The device can retrieve, identify, or determine metrics associated with the request. In some embodiments, the device can query the database to retrieve the metrics. For example, the device can retrieve metrics between the service providers and the data centers available to the clients to access the requested applications. In some embodiments, the device can use the request to query the database for metrics relating to the applications identified in the request and a location of a routing service transmitting the request. For example, the device can retrieve metrics for the service providers and the data centers that provide the requested application in the location or region of the routing service. The database can store and manage data relating to the application routing, such as the metrics. The database can be any type and form of database or data storage to store metrics or any other electronic record. The database can store mappings or associations among the service providers, the data centers, and the metrics. For example, individual metrics can represent network traffic parameters between the service providers and the data centers hosting applications. The database can store mappings and associations among the clients, the routing services, the service providers, the data centers, and the metrics.

The device can detect one or more metrics indicative of one or more connections between the data centers and the service providers (STEP 1206). In certain embodiments, the device can determine the location of the router based on an internet protocol (IP) address of a client communicably coupled to the router. In some embodiments, one or more metrics includes an availability of the service providers, latency of data accessed via a respective service provider from a respective data center, or data throughput via the respective service provider and the respective data center.

The device can determine the metrics from clients accessing the application. In some embodiments, the metrics include an availability of the service providers, latency of data accessed via a respective service provider from a respective data center, or data throughput via the respective service provider and the respective data center. The metrics can also include latency, network performance, duration, operating system, hardware, network latency, transmission delays, propagation delays, round trip time values, or connection reconnects and failures for each path between the clients and the application data centers. The device can identify a logon duration indicative of how much time the clients established connections with the application. The latency can indicate processing delays relating to time it takes the service providers or the data centers to process packet headers and other data that makes up the communications from the clients to the application. The device can identify queuing delays relating to time spent by the network traffic in routing queues of the service providers. The transmission delays can indicate time taken to transmit the network traffic by the service providers. The propagation delays can indicate time taken for the service providers or data centers to propagate the network traffic between the client and the application service. The round trip time values can indicate of how much time it takes for network traffic to travel from the clients and for the clients to receive an acknowledgment of that network traffic. The number of connection reconnects and failures can indicate the number of times each of the clients and the application lost their connection and had to restart or reconnect. The device can store the metrics in the database.

The device can detect metrics from the clients transmitting and/or receiving content items of the application. The clients can access, via one or more network paths, the applications deployed on the data centers, and these clients can provide metrics to the device relating to the one or more network paths between the clients and the data centers. The clients can transmit and/or receive the content item via the service providers and to/from the data centers that provide the application. The content items can include a beacon or any other simulation file used to acquire metrics. The clients can receive a response from the data centers deploying the application. The response can include or represent metrics relating to the connections between the client and the data centers which host or provide the application. The routing services can receive crowd-sourced metrics from the clients. For example, the response can indicate that the application latency is 37 ms. The database can receive and store the metrics. The database can store the metrics for device to create a reachability "map," N×M matrix, or paths between the service providers and the data centers.

The device can manage, identify, or determine metrics for individual paths. The device can identify metrics for each subset of the paths, such as from the client to the data centers or from the service providers to the data centers. The device can identify or determine a location of the service providers and the data centers. While individual service providers can refer to a combination of an ISP and its geolocation, the device can identify any additional or separate locations of the service providers as separate entities. The device can also identify or select an application for routing. The device can select application as service provider-aware, which represents application accessible by the clients via various service providers. By selecting the application for routing, the device can consider individual service providers available to access the application. The device can store such selections of application, and their corresponding DNS names and IP addresses, in the database.

If device does not detect the metrics, then the method 1200 can proceed to provide simulation content (STEP 1208). The device can request metrics from the routing services for the paths between the clients and the application. The requests can be to measure access to application or benchmark objects residing in an environment of the application. The device can select an application for which to acquire metrics. The request can include the application and their respective DNS domains and IP addresses of their respective data centers. In some embodiments, the device can generate content items for the routing service to transmit to the application, to acquire the metrics relating to the connection between the routing service and the application. In some embodiments, the device can generate content items for the application to transmit to a routing service, to acquire the metrics relating to the connection between the routing service and the application. The device can programmatically generate content items from individual applications to generate the metrics. The device can transmit the content items to the routing services and/or the application. The device can transmit instructions to the routing services for the routing services to transmit the metrics to the database.

The device can generate, identify, or acquire metrics. In some embodiments, the device can provide a content item to the application for acquiring the metrics. The content item can be a simulation file or a simulation tool for acquiring metrics. The device can provide the content item to the routing services, which route the content item across the paths. In some embodiments, the device can transmit, to the application, a notification identifying an application Domain Name System (DNS) and target IP addresses to use for probing the application. In some embodiments, the device can transmit instructions to the routing service to cause the routing service to automatically generate problems from the service providers towards the data centers. For example, the instructions can specify the problems to be network usage spikes, throttling, or bandwidth fluctuations. The routing services can transmit the content items or problems to the application. The routing services can transmit the content item via the service providers and to the data centers providing the application. The content items can include a beacon or any other simulation file to acquire metrics.

The device can detect metrics from the test content (STEP 1210). The routing services can receive a response from the application (which may include the content item from the application, or data relating to the content item sent to the data center from the routing services). The routing services can determine the metrics from the response. For example, the response can indicate that the application latency is 50 ms and that the network speed is 100 MB/s. The routing services can maintain an N×M reachability and latency matrix, which can complement the one stored in the database. The device can populate (e.g., pre-populate) the N×M matrix in the routing services. Pre-populating can offload the overhead of the DNS manipulation of the device, which can retrieve the metrics and update the routing services. The routing services or the device can use the acquired metrics to complement metrics acquired from the clients. The routing services can mitigate network issues, such as outages of any of the service providers or data centers, by relying on metrics acquired in a test environment (e.g., from the content items) and a use environment (e.g., from the clients). The routing services or the device can use both types of metrics to optimize the connection path. For example, a localized (e.g., citywide) latency spike might not be identified from the metrics acquired from the clients, but can be identified by the metrics acquired by the routing services. The routing services can store the metrics in the database. The routing services can transmit the metrics to the database for storage. The device can receive the data from the routers. In some embodiments, the device can receive metrics from the routing services responsive to routing services accessing the content item. In some embodiments, the device can aggregate the received metrics.

The device can select a service provider and a data center (STEP 1212). The device can select, identify, or specify paths for the client to use to access the application. The device can receive or retrieve metrics from the database. The device can use the metrics to select paths for routing the clients to the application. The device can select paths that including one of the service providers and one of the data centers. The device can select the paths based on the metrics managed by the metrics database. For example, the device can select the paths with the lowest latency as indicated by the metrics. By selecting the paths, the device selects the service providers and the data centers for the clients to use to access the application. In some embodiments, the device selects the service providers and the data centers based on the metrics between the service providers and the data centers.

The device can manage or store preferences of the clients and the application for the paths. The device can receive the preferences from the clients, the application, the database, and/or network administrators. The preferences can be for types of service providers (e.g., mobile network ISP or wired network). For example, the device can indicate that the clients or the application prefer fixed-line ISPs instead of mobile network ISPs. Similarly, the device can indicate that the clients or the application prefer certain types of data centers (e.g., those in certain jurisdictions or associated with certain power consumption costs).

The device can store, manage, or receive thresholds associated with the preferences for the paths. The thresholds indicate satisfactory differences between metrics at which point the routing services routes according to the non-preferred paths instead of preferred paths. The thresholds can include latency reductions, network speed increases, or any other network parameter defined by the metrics. For example, the threshold for latency reductions can be 25, 50, 75, 100, or 200 ms. The threshold for network speed increases can be 1, 2, 3, 4, 5, 10, 50, or 100 MB/s. The device can store the thresholds in the database.

The device can select, identify, or specify paths based on whether the paths use the preferred or not preferred service providers or data centers. The path selector can select paths based on the metrics satisfying thresholds for the preferences. The device can compare the metrics between the paths, determine whether the differences satisfy the thresholds, and determine which of the paths to use for communications between the clients and the application. For example, the device can select paths that are not preferred if the metrics for the non-preferred paths indicate a reduction in latency of at least 100 ms compared to the metrics of the preferred paths. Similarly, the device can select paths that are not preferred if the metrics for the non-preferred paths indicate an increase in network speed of at least 10 MB/s compared to the metrics of the preferred paths.

The device can generate instructions to select the service provider and data center (STEP 1214). The device can generate or create responses to the requests received by the device to access the application. Based on the selected paths, the device can identify the selected service providers and the selected data centers for the clients to use to access the application. The device can generate a response that indicates the selected service providers and the selected data centers. In some embodiments, the device can generate instructions to cause a router (or routing services) to use the selected service provider to access the selected data center included in the response to access the application. The instructions can select that the client take a primary path (e.g., primary path 610A) to a particular servicer provider and data center to access the application. The instructions can also select that the client take a secondary path (e.g., secondary path 610B) to a particular servicer provider and data center to access the application. The instructions can also update the client to take a different path (e.g., based on updated metrics subsequently acquired by the device).

The device can transmit the selection of the service provider and the data center (STEP 1216). The device can transmit or send a response to the request identifying the selected data center and the selected service provider. The device can update the routing of network traffic to and from application. The device can update the routing for application marked as service provider-aware. The device can update paths for the clients to access the application. The device can select which clients can use which paths. Similarly, the device can select which application can use which paths. For example, the clients or the application can have rules specifying types of service providers (e.g., cellular or wired) via which to establish access to the application from the clients. Similarly, the clients or the application can have rules specifying locations (e.g., USA or Europe) of service providers or data centers via which to establish access to the application from the clients.

The device can transmit the responses via an API. The API can be an interface of the routing services for configuration by the device. The device can transmit API calls via the API to configure the routing services. The API calls can include the paths for routing network traffic between the clients and the application. For example, the API calls can specify the primary path or the secondary path. The API calls can also specify which paths apply to which clients and application. For example, some clients and/or applications communicate via wired connections but not wireless connections, so the API calls specify that paths that include service providers using on a wired connection apply to those clients and/or applications. Similarly, the device can configure the routing services for a list of application. For example, the API calls can include DNS names of the application routed by the routing services. The device can mark the application as service provider-aware. The routing services can route clients via different service providers to access applications that are service provider-aware. By configuring the routing services, the clients can access the application via a variety of paths. For example, the routing services can route clients 165 via the primary path or the secondary path to access the application.

The API calls can include the instructions to configure the routing services. In certain embodiments, the device can transmit the instructions to the routing service to cause the routing service to select the selected service providers and the selected data centers. In some embodiments, the response includes a table or other arrangement of information that includes the metrics for the service providers in relation to the data centers. For example, the response can include the N×M matrix. The device can also configure the routing services to identify and acquire metrics of the application selected for routing. For example, the device can transmit instructions that select the application selected for routing by the device.

The device can transmit or send the preferences and thresholds to the routing services. The device can generate instructions with which to configure the routing services to use the paths based on the preferences and thresholds. The device can configure the routing services to use the preferences and thresholds if the routing services receive the paths from an entity other than the device. For example, the routing services can receive the paths from a network administrator or the GSLB. The device can configure the routing services to use the preferences and thresholds to determine whether to use paths using non-preferred service providers or data centers.

In some embodiments, an administrator (e.g., administrator 702) can manage or control the routing service. The administrator can be a device operated or used by a person or entity designated to maintain or manage networking infrastructure. The administrator can configure the routing services by modifying the paths according to which the routing services route network traffic between the clients and the application. The administrator can configure the routing service by making or transmitting API calls. The administrator can transmit the API calls via the API established by the routing service to configure the routing of network traffic between the clients and the application. For example, the API can enable the administrator to configure paths, select preferred paths, or perform network simulations to acquire metrics. The API can include a user interface.

In some embodiments, the routing services can submit DNS queries to global server load balancers (e.g., load balancer 304). The routing services can submit the DNS queries to the GSLB to determine the paths for providing access to the application for the clients. The routing services can submit the DNS queries based on requests received from the clients to access the application. The DNS queries can specify the application that the clients are to access. By configuring the routing services to route clients to application available via different service providers, the routing services can enrich or otherwise modify the requests from the clients into enriched or modified DNS queries. The routing services can enrich the DNS query for individual domains associated with or otherwise assigned to the application. The enrichment can specify that the application is accessible via different service providers. The enrichment provides the GSLB with data for consideration when routing the clients across different service providers and different data centers, instead of just via different data centers accessible from one of the service providers that correspond to the source IP of the clients submitting the DNS request. To enrich the DNS request, the routing services can identify the application specified in the DNS request from the clients. For example, the requests from the clients can specify with which application the clients are requesting access. The routing services can provide metadata or other information for enriching the DNS requests for all the service providers associated with the routing services. The routing service can also omit unavailable service providers. For example, the service providers can omit service providers that are offline or that cannot provide access to the requested applications.

The GSLB can retrieve metrics for paths available to access the application. The GSLB can retrieve the metrics from the database. The GSLB can retrieve the metrics that correspond to the service providers and the data centers that make up individual paths for accessing the application. The GSLB can retrieve the metrics for paths available to clients having the source IP associated with the DNS query. The GSLB can select paths for accessing the applications. The GSLB can select paths based on the metrics associated with those paths. For example, the GSLB can select paths that provide the lowest latency for the clients to access the application. The GSLB can transmit the selected paths to the routing services as a DNS response. The DNS response can be a response to the DNS query received from the routing services. The DNS response can include at least one of the paths for the clients to access the application. The DNS response can indicate the service providers and the data centers the clients can use to access the application. The DNS response can also include metadata or information (e.g., matrix information) associated with selecting the paths. For example, the enriched response can include the pairings between the data centers and the service providers, and contents from the routing tables, such as metrics of the N×M matrix for individual paths.

The routing services can receive and update the paths. The routing services can receive the DNS response from the GSLB. The DNS response can be the enriched response. The routing services can use the enriched response to update its internal database to specify or override paths. The routing services can identify, in the DNS response, the paths for routing the clients to access the application. The routing services can update its routing protocols with the identified paths. The routing services can route the clients to the application based on the paths. The routing services can establish the paths for the clients to access the application. For example, the routing services can establish a path from the service provider to the data center to access the application. The routing services can apply the enriched response in certain conditions.

The routing services can determine whether to use the selected paths based on preferences (e.g., predetermined preferences) of the clients and the application for the paths. The routing service can receive the preferences from the device. The preferences can be for types of service providers (e.g., mobile network ISP or wired network). For example, the routing services can identify that the clients or the application prefer fixed-line ISPs instead of mobile network ISPs. Similarly, the routing services can identify that the clients or the application prefer certain types of data centers (e.g., those in certain jurisdictions or associated with certain power consumption costs). Therefore, the routing services can decide to use paths that use preferred service providers or data centers, and decline to use paths that use non-preferred service providers or data centers.

The routing services can use the selected paths based on the metrics satisfying thresholds for the preferences. The routing services can receive the thresholds for applying the paths from the device. Thresholds can include latency reductions, network speed increases, or any other network parameter defined by the metrics. The routing service can compare the metrics of the paths in view of the thresholds to determine which of the paths to use for communications between the clients and the application. For example, the routing services can use paths that are not preferred if the metrics for the non-preferred indicate a reduction in latency of at least 100 ms compared to the metrics of the preferred paths. Similarly, the routing services can use paths that are not preferred if the metrics for the non-preferred paths indicate an increase in network speed of at least 10 MB/s compared to the metrics of the preferred paths.

Figure 13:
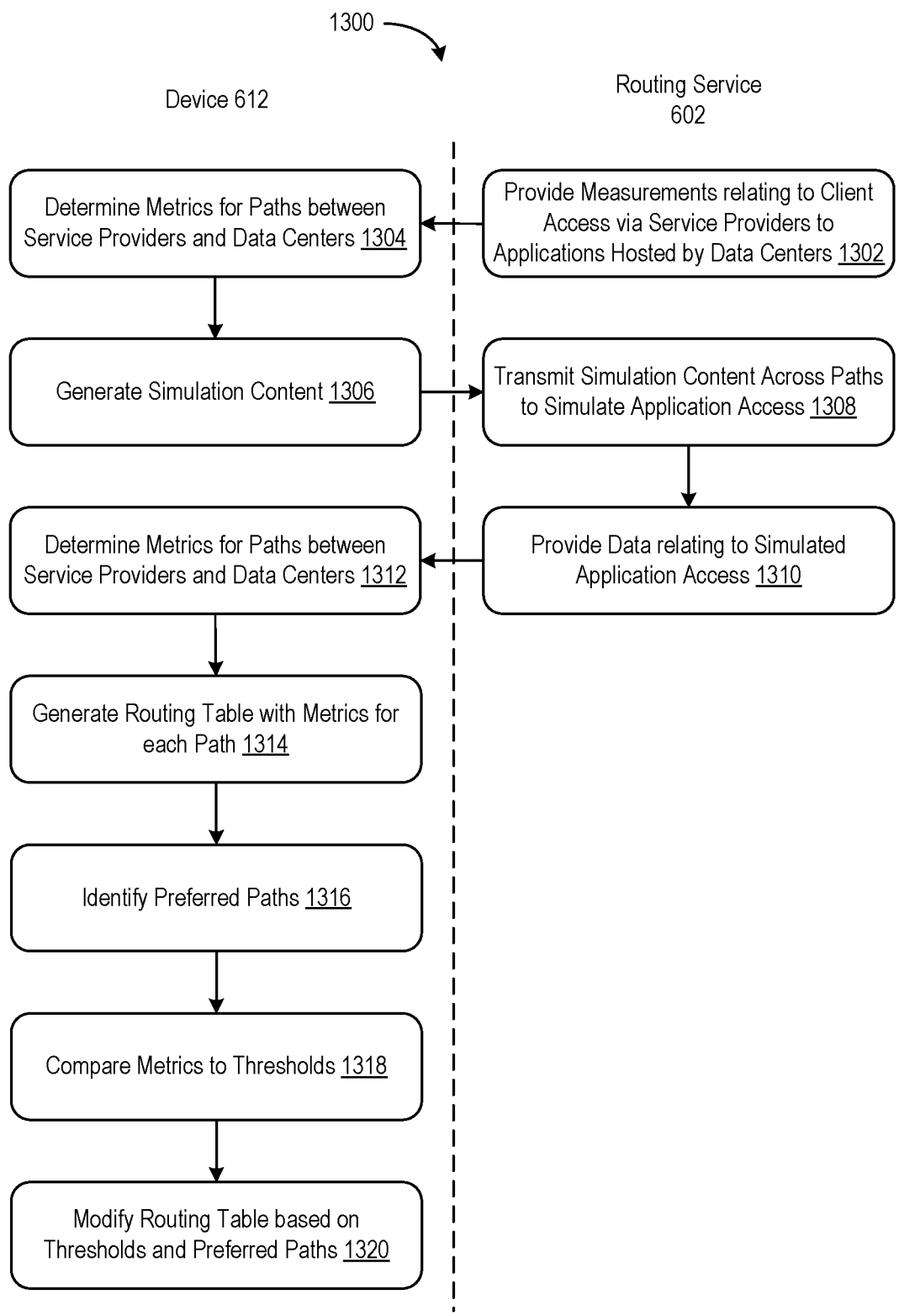
FIG. 13 is a diagram of a method for detecting metrics in accordance with yet another illustrative embodiment.

Referring now to FIG. 13 and in brief overview, depicted is a diagram of a flow 1300 for detecting metrics in accordance with yet another illustrative embodiment. The components described in FIGS. 1-12, and/or the system 600 detailed above can perform the operations and functionalities of the method 1300. In brief overview, a routing service (e.g., routing service 602) can provide measurements relating to client access via service providers (e.g., service providers 604) to applications (e.g., applications 608) hosted by data centers (e.g., data centers 606) (STEP 1302). A device (e.g., device 612) can determine metrics (e.g., paths 624) for paths (e.g., paths 610) between service providers and data centers (STEP 1304). The device can generate simulation content (STEP 1306). The routing service can transmit simulation content across paths to simulate application access (STEP 1308). The routing service can provide measurements relating to simulated application access (STEP 1310). The device can determine metrics for paths between service providers and data centers (STEP 1312). The device can generate a routing table with metrics for each path (STEP 1314). The device can identify preferred paths (STEP 1316). The device can compare metrics to thresholds (STEP 1318). The device can modify the routing table based on thresholds and preferred paths (STEP 1320).

The routing service can provide data relating to client access via service providers to applications hosted by data centers (STEP 1302). The routing service can request the measurements from the clients, the service providers, or the data centers. The routing service can receive the measurements from the clients, the service providers, or the data centers. The measurements can be an availability of the service providers, latency of data accessed via a respective service provider from a respective data center, and/or data throughput via the respective service provider and the respective data center. The measurements can also include latency, network performance, duration, operating system, hardware, network latency, transmission delays, propagation delays, round trip time values, or connection reconnects and failures for each path between the clients and the data centers. The routing service can provide the measurements to the device.

The device can determine metrics for paths between service providers and data centers (STEP 1304). The device can determine the metrics from the measurements. The device can manage, identify, or determine metrics for individual paths. The device can identify metrics for individual subsets of the paths, such as from the client to the data centers and/or from the service providers to the data centers. The device can identify or determine a location of the service providers and the data centers. While individual service providers can refer to a combination of an ISP and its geolocation, the device can identify any additional or separate locations of the service providers as separate entities. The device can also identify or select an application for routing. The device can select application as service provider-aware, which represents application accessible by the clients via various service providers. By selecting the application for routing, the device can consider individual service providers available to access the application. The device can store such selections of application, and their corresponding names or identifiers (e.g., DNS names) and IP addresses, in the database.

The device can generate simulation content (STEP 1306). The simulation content can simulate access to the applications by the clients via the paths. The simulation content can be a content item, a program, file, computer-readable instructions, a simulation file, or a simulation tool for acquiring metrics. The simulation content can include information for establishing a connection by the routing services with the application. The device can provide the simulation content to the application for acquiring the metrics. The device can specify the paths along which the routing services can send the simulation content. The device can specify the data centers or applications that the routing services can send the simulation content. The device can provide the content item to the routing services to route the content item across the paths to simulate application access by the clients.

The routing service can transmit simulation content across paths to simulate application access (STEP 1308). The routing services can transmit the simulation content to simulation access to the applications by the clients. The routing service can transmit the simulation content along specified paths. The routing service can transmit the simulation content along specified paths. The routing service can receive, determine, or obtain measurements or data relating to the simulation content. The measurements or data can be associated with transmitting the simulation content, identifications of the service providers or data centers, receiving responses responsive to the simulation content, or any other information (e.g., time stamps) about the simulated application access.

The routing service can provide measurements relating to simulated application access (STEP 1310). For example, the routing service can provide a time stamp corresponding to transmission of the simulation content, or a receipt of the simulation content. The routing service can provide an amount of data transmitted to the applications during the simulation. The routing service can provide information about the paths, service providers, or data centers used for the simulated application access.

The device can determine metrics for paths between service providers and data centers (STEP 1312). The device may be configured to obtain metrics from data or measurements relating to routing, downloading, transmitting, receiving, or otherwise exchanging of the content item between the data center and the routing service. The metrics can indicate latency, transmission delays, propagation delays, round trip time values, or connection reconnects and failures for each path along during the transmission of simulation content. For example, the device can determine the latency to indicate processing delays relating to time it takes the service providers or the data centers to process packet headers and other data that constitutes the communications from the clients to the application. The device can identify queuing delays relating to time spent by the network traffic in routing queues of the service providers. The transmission delays can indicate time taken to transmit the network traffic by the service providers. The propagation delays can indicate time taken for the service providers or data centers to propagate the network traffic between the client and the routing service. The round trip time values can indicate a duration of time between network traffic being transmitted from the clients and the clients receiving an acknowledgment of that network traffic. The number of connection reconnects and failures can indicate the number of times in which clients and the application lose their connection with one another and had to restart or reconnect.

The device can generate a routing table with metrics for each path (STEP 1314). The routing table can be the N×M matrix, wherein the N corresponds to service providers and the M corresponds to data centers. In particular, individual N rows can correspond to one of the service providers, and individual M columns can correspond to one of the data centers. The device can associate, assign, or represent individual metrics with different paths. The device can identify individual service providers accessible to the routing services. To represent or manage different combinations between the service providers and the data centers, the device can create the N×M matrix.

The device can identify preferred paths (STEP 1316). The device can be configured to manage or store preferences of the clients and the application for the paths. The device can receive the preferences from the clients, the application, the database, and/or network administrators. The preferences can be for types of service providers (e.g., 4G, LTE, mobile network ISP, or wired network). For example, the device can store a preference that specifies that the clients or the application prefer fixed-line ISPs instead of mobile network ISPs. In another example, the device can store a preference that specifies that the clients can use paths that include mobile network ISPs if those paths provide a latency that is at least 100 ms lower than latencies of paths that use fixed-line ISPs. Similarly, the device can indicate that the clients or the application prefer certain types of data centers (e.g., those in certain jurisdictions or associated with certain power consumption costs). The device can identify the preferred paths in the routing table. For example, the device can identify or select the paths that include the preferred service providers (e.g., wired networks).

The device can compare metrics to thresholds (STEP 1318). The device can store, manage, or receive thresholds associated with or otherwise assigned to the preferences for the paths. The thresholds indicate satisfactory differences between metrics at which point the routing services route according to the non-preferred paths instead of preferred paths. The thresholds can include latency reductions, network speed increases, or any other network parameter defined by the metrics. For example, the threshold for latency reductions can be 25, 50, 75, 100, and/or 200 ms. The threshold for network speed increases can be 1, 2, 3, 4, 5, 10, 50, and/or 100 MB/s, for example. The device can compare the metrics to the thresholds. For example, the device compare a path along a non-preferred (e.g., wireless network) service provider with a metric that indicates a latency reduction of 250 ms relative to a path along a preferred (e.g., wired network) service provider to a threshold for latency reduction of 200 ms. In the previous example, the latency reduction of 250 ms can satisfy the threshold of 200 ms.

The device can modify the routing table based on thresholds and preferred paths (STEP 1320). The device can organize or sort the routing table based on the thresholds and preferred paths. The device can assign a ranking or prioritization to paths that include preferred service providers or data centers. Similarly, the device can assign a ranking or prioritization to paths based on their metrics (e.g., lowest latency) or those that satisfy the thresholds. The device can assign the ranking or prioritization based on both the preferred components and the thresholds, such as via a weighted prioritization. The device can modify the routing table based on inputs received from a network administrator. The device can present the modified routing table for selection of paths along which to provide application access to clients.

E. Example Embodiments

The following examples pertain to further example embodiments, from which permutations and configurations will be apparent.

Example 1 includes a method. The method includes receiving, by a device, a request to access an application. The application may be provided by one of a plurality of data centers and accessible via one of a plurality of service providers. The method includes selecting, by the device, a data center from the plurality of data centers and a service provider from the plurality of service providers based at least on a metric indicative of a connection between the data center and the service provider. The method includes transmitting, by the device, a response to the request identifying the selected data center and the selected service provider.

Example 2 includes the subject matter of Example 1, wherein selecting the data center and the service provider includes querying, by the device, a database including one or more metrics indicative of one or more connections using the application identified in the request and a location of a router transmitting the request.

Example 3 includes the subject matter of any of Examples 1 and 2, wherein the location of the router is determined based on an internet protocol (IP) address of a client communicably coupled to the router.

Example 4 includes the subject matter of any of Examples 1 through 3, wherein the metric includes an availability of the plurality of service providers, latency of data accessed via a respective service provider from a respective data center, or data throughput via the respective service provider and the respective data center.

Example 5 includes the subject matter of any of Examples 1 through 4, wherein the response includes a table including one or more metrics indicative of one or more connections for the plurality of service providers in relation to the plurality of data centers.

Example 6 includes the subject matter of any of Examples 1 through 5, further comprising generating, by the device, instructions to cause a router to use the selected service provider to access the selected data center included in the response to access the application.

Example 7 includes the subject matter of any of Examples 1 through 6, further comprising transmitting, by the device, the instructions to the router to cause the router to select the service provider of the plurality of service providers and the data center of the plurality of data centers.

Example 8 includes the subject matter of any of Examples 1 through 7, further comprising transmitting, by the device to the application, a notification identifying an application domain name system (DNS) and target IP addresses to use for probing the application. The method may further include transmitting, by the device to a router, instructions to cause the router to automatically detect network problems between each of the plurality of service providers and each of the plurality of data centers.

Example 9 includes the subject matter of any of Examples 1 through 8, further comprising providing, by the device, a content item to the application for acquiring one or more metrics indicative of one or more connections responsive to the content item accessed via a plurality of routers. The method may further include receiving, by the device, from the plurality of routers, data responsive to the content item being accessed via the respective routers. The one or more metrics may be aggregated from the received data of the plurality of routers.

Example 10 includes the subject matter of any of Examples 1 through 9, wherein the plurality of service providers are a plurality of internet service providers.

Example 11 includes a device. The device includes one or more processors configured to receive a request to access an application. The application is provided by one of a plurality of data centers and accessible via one of a plurality of service providers. The one or more processors are configured to select a data center from the plurality of data centers and a service provider from the plurality of service providers based at least on a metric indicative of a connection between the data center and the service provider. The one or more processors are configured to transmit a response to the request identifying the selected data center and the selected service provide.

Example 12 includes the subject matter of Example 11, wherein selecting the data center and the service provider includes querying a database including one or more metrics indicative of one or more connections using the application identified in the request and a location of a router transmitting the request.

Example 13 includes the subject matter of any of Examples 11 and 12, wherein the location of the router is determined based on an internet protocol (IP) address of a client communicably coupled to the router.

Example 14 includes the subject matter of any of Examples 11 through 13, wherein the metric includes an availability of the plurality of service providers, latency of data accessed via a respective service provider from a respective data center, or data throughput via the respective service provider and the respective data center.

Example 15 includes the subject matter of any of Examples 11 through 14, wherein the response includes a table including one or more metrics indicative of one or more connections for the plurality of service providers in relation to the plurality of data centers.

Example 16 includes the subject matter of any of Examples 11 through 15, wherein the one or more processors are further configured to generate instructions to cause a router to use the selected service provider to access the selected data center included in the response to access the application.

Example 17 includes the subject matter of any of Examples 11 through 16, wherein the one or more processors are further configured to transmit the instructions to the router to cause the router to select the service provider of the plurality of service providers and the data center of the plurality of data centers.

Example 18 includes the subject matter of any of Examples 11 through 17, wherein the one or more processors are further configured to transmit, to the application, a notification identifying an application domain name system (DNS) and target IP addresses to use for probing the application. The one or more processors may further be configured to transmit, to a router, instructions to cause the router to automatically detect network problems between each of the plurality of service providers and each of the plurality of data centers.

Example 19 includes the subject matter of any of Examples 11 through 18, wherein the one or more processors are further configured to provide a content item to the application for acquiring one or more metrics indicative of one or more connections responsive to the content item accessed via a plurality of routers. The one or more processors may further be configured to receive, from the plurality of routers, data responsive to the content item being accessed via the respective routers. The one or more metrics may be aggregated from the received data of the plurality of routers.

Example 20 includes a non-transitory computer readable medium storing program instructions that, when executed by one or more processors, cause the one or more processors to receive a request to access an application. The application is provided by one of a plurality of data centers and accessible via one of a plurality of service providers. The computer-readable medium further stores instructions that cause the one or more processors to select a data center from the plurality of data centers and a service provider from the plurality of service providers based at least on a metric indicative of a connection between the data center and the service provider. The computer-readable medium further stores instructions that cause the one or more processors to transmit a response to the request identifying the selected data center and the selected service provider.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer-readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer-readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   receiving, by a device, a request to access an application, the application being provided by at least one of a plurality of data centers and accessible via at least one of a plurality of internet service providers;
   selecting, by the device, a data center from the plurality of data centers based at least on one or more metrics indicative of a connection between the data center and an internet service provider;
   selecting, by the device, the internet service provider from the plurality of internet service providers based at least on the one or more metrics indicative of the connection between the data center and the internet service provider; and
   transmitting, by the device, a response to the request identifying the selected data center and the selected internet service provider.

2. The method of claim 1, wherein selecting the data center and the internet service provider comprises querying, by the device, a database including one or more metrics indicative of one or more connections using the application identified in the request and a location of a router transmitting the request.

3. The method of claim 2, wherein the location of the router is determined based on an internet protocol (IP) address of a client communicably coupled to the router.

4. The method of claim 1, wherein the metric comprises an availability of the plurality of internet service providers, latency of data accessed via a respective internet service provider from a respective data center, or data throughput via the respective internet service provider and the respective data center.

5. The method of claim 1, wherein the response comprises a table including one or more metrics indicative of one or more connections for the plurality of internet service providers in relation to the plurality of data centers.

6. The method of claim 1, further comprising generating, by the device, instructions to cause a router to use the selected internet service provider to access the selected data center included in the response to access the application.

7. The method of claim 6, further comprising transmitting, by the device, the instructions to the router to cause the router to select the internet service provider of the plurality of internet service providers and the data center of the plurality of data centers.

8. The method of claim 1, further comprising:
   transmitting, by the device to the application, a notification identifying an application domain name system (DNS) and target IP addresses to use for probing the application; and
   transmitting, by the device to a router, instructions to cause the router to automatically detect network problems between each of the plurality of internet service providers and each of the plurality of data centers.

9. The method of claim 1, further comprising:
   providing, by the device, a content item to the application for acquiring one or more metrics indicative of one or more connections responsive to the content item accessed via a plurality of routers; and
   receiving, by the device, from the plurality of routers, data responsive to the content item being accessed via the respective routers,
   wherein the one or more metrics are aggregated from the received data of the plurality of routers.

10. A device comprising:
    one or more processors configured to:
       receive a request to access an application, the application being provided by at least one of a plurality of data centers and accessible via at least one of a plurality of internet service providers;
       select a data center from the plurality of data centers based at least on one or more metrics indicative of a connection between the data center and an internet service provider;
       select the internet service provider from the plurality of internet service provides based on the one or more metrics indicative of the connection between the data center and the internet service provider; and
       transmit a response to the request identifying the selected data center and the selected internet service provider.

11. The device of claim 10, wherein selecting the data center and the internet service provider comprises querying a database including one or more metrics indicative of one or more connections using the application identified in the request and a location of a router transmitting the request.

12. The device of claim 11, wherein the location of the router is determined based on an internet protocol (IP) address of a client communicably coupled to the router.

13. The device of claim 10, wherein the metric comprises an availability of the plurality of internet service providers, latency of data accessed via a respective internet service provider from a respective data center, or data throughput via the respective internet service provider and the respective data center.

14. The device of claim 10, wherein the response comprises a table including one or more metrics indicative of one or more connections for the plurality of internet service providers in relation to the plurality of data centers.

15. The device of claim 10, wherein the one or more processors are further configured to generate instructions to cause a router to use the selected internet service provider to access the selected data center included in the response to access the application.

16. The device of claim 15, wherein the one or more processors are further configured to transmit the instructions to the router to cause the router to select the internet service provider of the plurality of internet service providers and the data center of the plurality of data centers.

17. The device of claim 10, wherein the one or more processors are further configured to:
    transmit, to the application, a notification identifying an application domain name system (DNS) and target IP addresses to use for probing the application; and
    transmit, to a router, instructions to cause the router to automatically detect network problems between each of the plurality of internet service providers and each of the plurality of data centers.

18. The device of claim 10, wherein the one or more processors are further configured to:
    provide a content item to the application for acquiring one or more metrics indicative of one or more connections responsive to the content item accessed via a plurality of routers; and
    receive, from the plurality of routers, data responsive to the content item being accessed via the respective routers,
    wherein the one or more metrics are aggregated from the received data of the plurality of routers.

19. A non-transitory computer-readable medium storing instructions that, when executed by one or more processors, cause the one or more processors to:
    receive a request to access an application, the application being provided by at least one of a plurality of data centers and accessible via at least one of a plurality of internet service providers;
    select a data center from the plurality of data centers based at least on one or more metrics indicative of a connection between the data center and an internet service provider;
    select the internet service provider from the plurality of internet service provides based on the one or more metrics indicative of the connection between the data center and the internet service provider; and
    transmit a response to the request identifying the selected data center and the selected internet service provider.

* * * * *